(12) United States Patent
Matos

(10) Patent No.: US 9,946,930 B2
(45) Date of Patent: Apr. 17, 2018

(54) APPARATUS AND METHOD FOR VERIFYING THE IDENTITY OF AN AUTHOR AND A PERSON RECEIVING INFORMATION

(71) Applicant: Jeffrey A. Matos, New Rochelle, NY (US)

(72) Inventor: Jeffrey A. Matos, New Rochelle, NY (US)

(*) Notice: Subject to any disclaimer, the term of this patent is extended or adjusted under 35 U.S.C. 154(b) by 0 days.

(21) Appl. No.: 15/426,466

(22) Filed: Feb. 7, 2017

(65) Prior Publication Data

US 2017/0243062 A1    Aug. 24, 2017

Related U.S. Application Data

(60) Continuation-in-part of application No. 14/874,922, filed on Oct. 5, 2015, now Pat. No. 9,563,810, which is a division of application No. 13/563,399, filed on Jul. 31, 2012, now Pat. No. 9,152,837, which is a continuation-in-part of application No. 12/157,469, filed on Jun. 11, 2008, now Pat. No. 8,233,672.

(60) Provisional application No. 60/934,403, filed on Jun. 13, 2007.

(51) Int. Cl.
*G06K 9/00* (2006.01)
*G06F 21/32* (2013.01)
*H04L 29/08* (2006.01)

(52) U.S. Cl.
CPC ......... *G06K 9/00617* (2013.01); *G06F 21/32* (2013.01); *G06K 9/0061* (2013.01); *G06K 9/00604* (2013.01); *H04L 67/12* (2013.01)

(58) Field of Classification Search
CPC ............ G06K 9/00617; G06K 9/0061; G06K 9/00604; G06F 21/32; H04L 67/12
See application file for complete search history.

(56) References Cited

U.S. PATENT DOCUMENTS

| 5,229,764 A | 7/1993 | Matchett et al. ............ 340/5.52 |
| 6,542,624 B1* | 4/2003 | Oda .................... G06K 9/00597 382/117 |
| 7,099,495 B2* | 8/2006 | Kodno ................. G06K 9/0061 382/115 |

(Continued)

*Primary Examiner* — John Strege
(74) *Attorney, Agent, or Firm* — Karl F. Milde, Jr.; Eckert Seamans Cherin & Mellot, LLC

(57) ABSTRACT

Apparatus for identifying a person who wishes to receive information, where identifying information for each of a plurality of registered individuals is stored in a database, calls for capturing images of an individual requesting information, and determining whether this individual is the same as one of the registered individuals. The stored identifying information includes images of a unique, observable biologic identifier on a body portion of each registered individual. The specificity of the identification process is enhanced by storing registered examples of altered biological information in the database, by allowing the information provider to induce an alteration in a biologic identifier of a requesting person at the time of the request, and by comparing the altered requesting person information to stored information. Further identification enhancement is obtained by rapidly altering the visual environment of the requesting person, and by providing the requested information to the retina of the requesting person.

41 Claims, 37 Drawing Sheets

(56) References Cited

U.S. PATENT DOCUMENTS

| | | | | |
|---|---|---|---|---|
| 7,346,195 B2* | 3/2008 | Lauper | ............... | G06K 9/00597 |
| | | | | 382/117 |
| 2006/0072793 A1* | 4/2006 | Determan | .......... | G06K 9/00335 |
| | | | | 382/117 |
| 2006/0115130 A1* | 6/2006 | Kozlay | .............. | G02B 27/0093 |
| | | | | 382/117 |
| 2010/0138668 A1* | 6/2010 | Tsuria | ..................... | G06F 21/32 |
| | | | | 713/186 |
| 2012/0140993 A1 | 6/2012 | Bruso et al. | .................. | 382/118 |

* cited by examiner

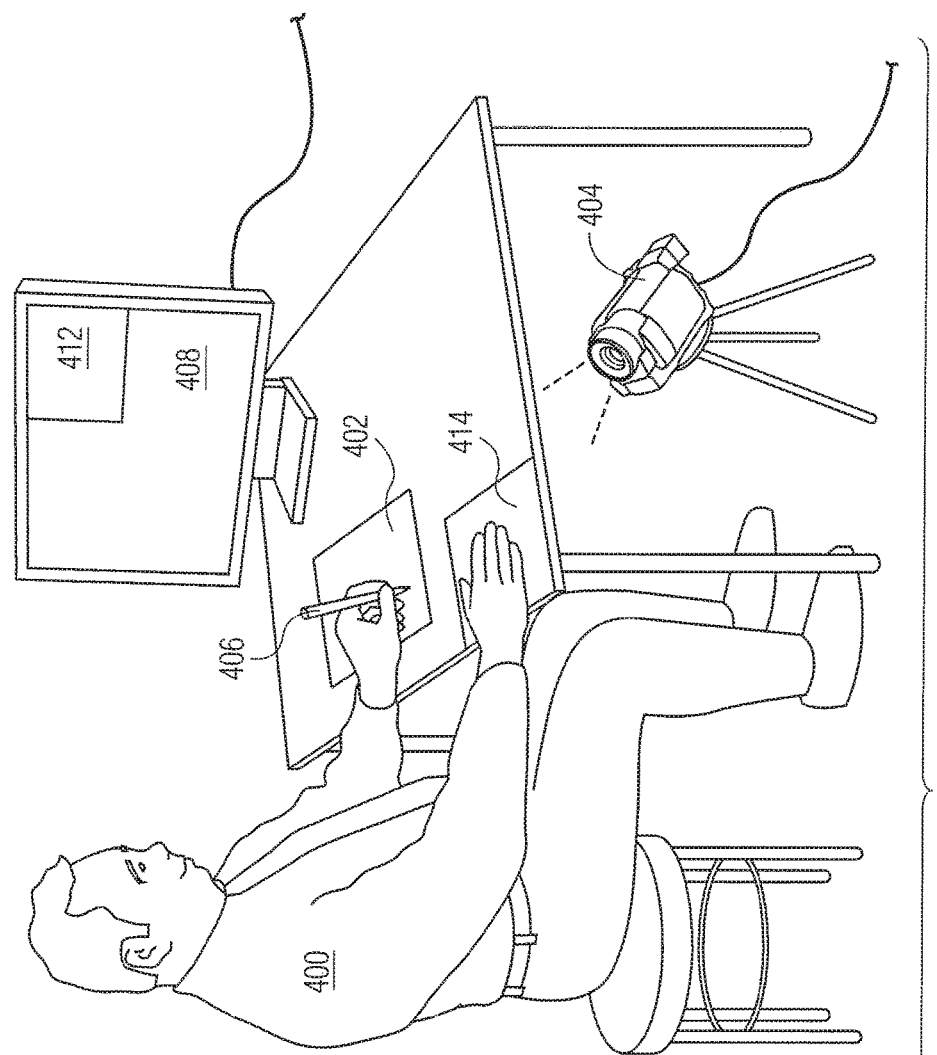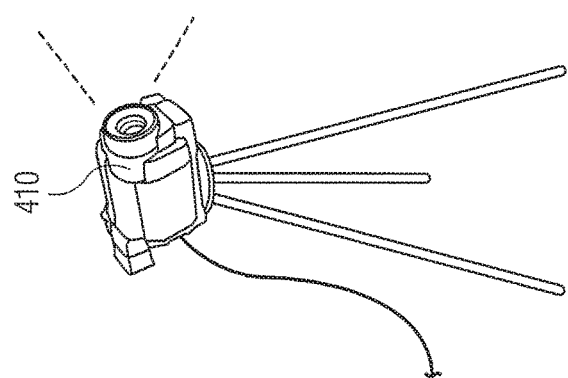
FIG. 4

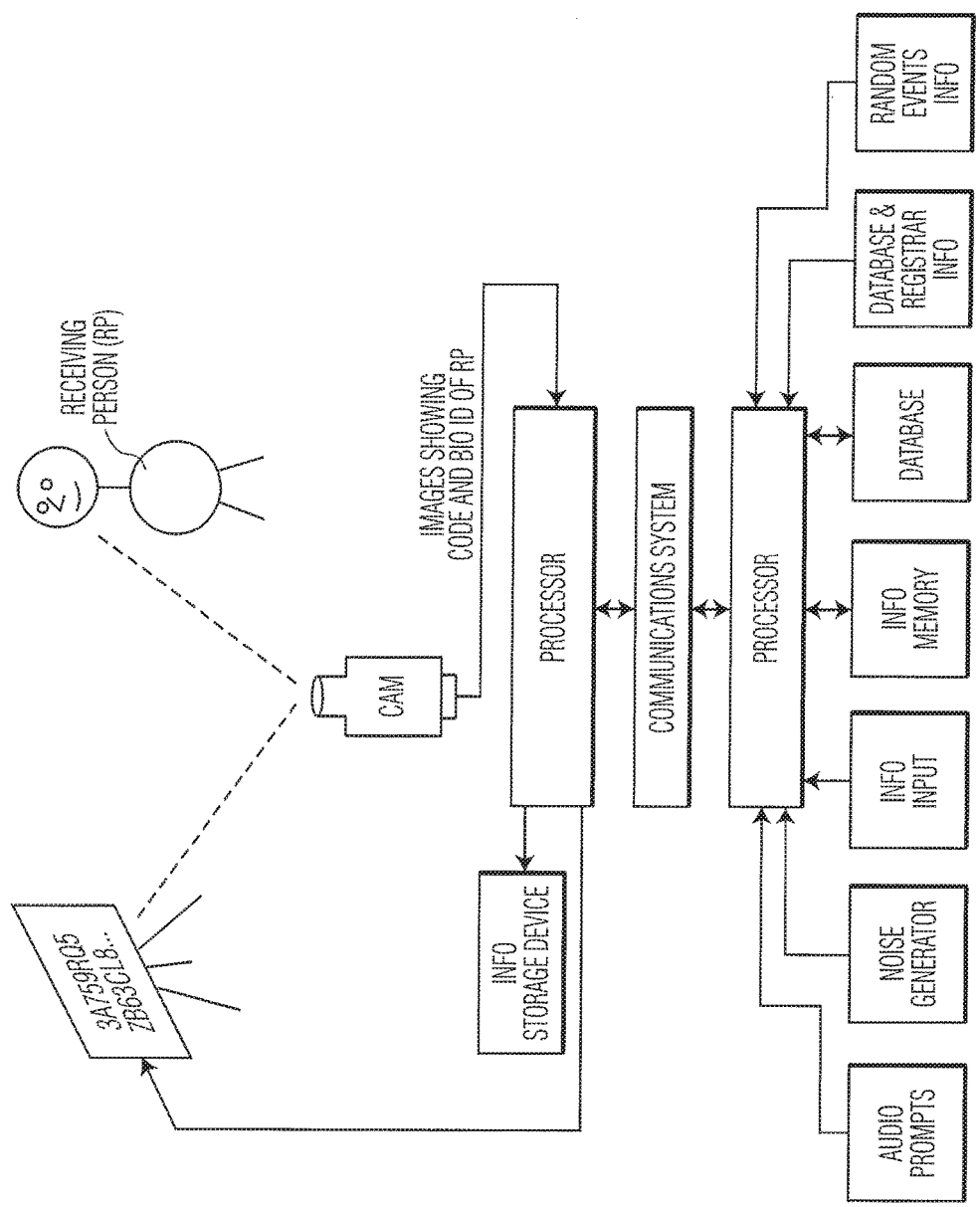

APPARATUS AND METHOD FOR VERIFYING THE IDENTITY OF AN AUTHOR AND A PERSON RECEIVING INFORMATION

CROSS-REFERENCE TO RELATED APPLICATION

This present application claims the benefit of priority from U.S. Provisional Application Ser. No. 60/934,043, filed Jun. 11, 2007, entitled "APPARATUS AND METHODS FOR REMOTE VOTING AND FOR GOVERNMENT AND CORPORATE SYSTEMS BASED ON REMOTE VOTING," and claims the benefit of priority of the U.S. patent application Ser. No. 12/157,469, filed Jun. 11, 2008, and entitled "APPARATUS AND METHOD FOR VERIFYING THE IDENTITY OF AN AUTHOR" now U.S. Pat. No. 8,233,672. This application is a continuation-in-part of U.S. patent application Ser. No. 14/874,922, filed Oct. 5, 2015, (now allowed), entitled "APPARATUS AND METHOD FOR VERIFYING THE IDENTITY OF AN AUTHOR AND A PERSON RECEIVING INFORMATION". The application Ser. No. 14/874,922 is a divisional of U.S. patent application Ser. No. 13/563,399, filed on Jul. 31, 2012, now U.S. Pat. No. 9,152,837, which is a continuation-in-part of the aforesaid application Ser. No. 12/157,469.

This application is related to applicant's prior application Ser. No. 12/714,649, filed Mar. 1, 2010, entitled "Voting Apparatus and System" (U.S. Patent Publication No. 2010/0153190). This Publication No. 2010/0153190 is incorporated herein by reference.

This application is also related to applicant's prior application Ser. No. 13/834,634, filed Mar. 15, 2013, entitled APPARATUS FOR PREVENTING UNAUTHORIZED ACCESS TO COMPUTER FILES AND FOR SECURING MEDICAL RECORDS (U.S. Patent Publication No. 2014/0278529). This Publication No. 2014/0278529 is also incorporated herein by reference.

BACKGROUND OF THE INVENTION

There are a multitude of situations in which it is necessary to be able to document the identity of an individual who produces visually observable material or actions indicating the thoughts or decisions of that individual. Examples of such situations involve an individual who (i) produces written text material, (ii) indicates choices on a touch sensitive screen, (iii) produces alphanumeric entries using a keyboard, (iv) produces artwork, (v) produces a musical work with written material.

SUMMARY OF THE INVENTION

It is a principal object of the present invention to provide a method and apparatus which links the image of an individual (containing identifying features), obtained during a registration process, to the image of an individual author, during his or her act of generating the observable material that reflects the author's thoughts or decisions, thereby to verify the identity of the author with a high degree of confidence.

This object, as well as further objects which will become apparent from the discussion that follows, is achieved, in accordance with the invention, by apparatus which comprises:

(a) a computer database in which are stored an image of a visible identifying feature and other identification data of each of a plurality of registered human individuals;

(b) a computer processor coupled to the database for storing information therein and for accessing selected information therefrom; and (c) one or more input devices, coupled to the processor and disposed at a local site where an individual is to create writings or make computer entries. The input device(s) includes at least one camera arranged to view and capture a local image of both the identifying feature and at least a portion of a hand of the individual that is engaged in a writing or computer entry process.

The processor is operative to store the local image(s) in said database for later retrieval, and to compare the stored identifying feature of said registered human individuals with the local image(s) of the individual's identifying feature generated during the writing or computer entry process.

By such comparison, the apparatus can thus verify that the identity of the individual who made the writing or computer entry is the same as one of the registered individuals.

Similarly, the aforementioned objects of the present invention are achieved by a method for identifying the writer of a document which comprises the steps of:

(a) storing in a database identifying information for each of a plurality of registered human individuals, this identifying information including both an alphanumeric identifier and an image of a unique, visually observable biologic identifier on a body portion of the respective individual;

(b) capturing local images which include both:
  (i) making of at least one of writings and keyboard entries by an individual whose identifying information may be stored in the database; and
  (ii) [substantially simultaneous with the capture of (i),] a body portion of said one individual on which is visible said biologic identifier; and (c) determining whether said individual making the writings and/or keyboard entries is the same as one of the registered individuals whose identifying information is stored in said database, by verifying the substantial equivalence of the local image of the visually observable biological identifier and one said images of the body portion stored in the database.

The inventions herein also provide apparatus and methods for identifying the receiver of information. Identification is based on
  Biologic identification
  Biodynamic identification—that is the manipulation of a biologic identifier (such as the iris of an eye, by the application of light to the eye)
  Manipulation of the environment of the biologic identifier (such as displaying a highly complex, rapidly changing code in the vicinity of a biologic identifier and then imaging the two (code plus biologic identifier) together
  Providing information directly onto the retinal surface of the eye of a biologically identified person.

Such receiver identification techniques can be carried out prior to sending information or throughout the information sending process.

By carefully identifying both the sender and the receiver participating in a "conversation" or information exchange, the enhancement of communication security is possible.

For a full understanding of the present invention, reference should now be made to the following detailed descrip-

BRIEF DESCRIPTION OF THE DRAWINGS

FIG. 4 shows a representational diagram of an apparatus for registration and author data and image capture.

FIG. 17C is yet another block diagram of apparatus in a third preferred embodiment of the invention.

DETAILED DESCRIPTION OF THE PREFERRED EMBODIMENTS

Figure 1:
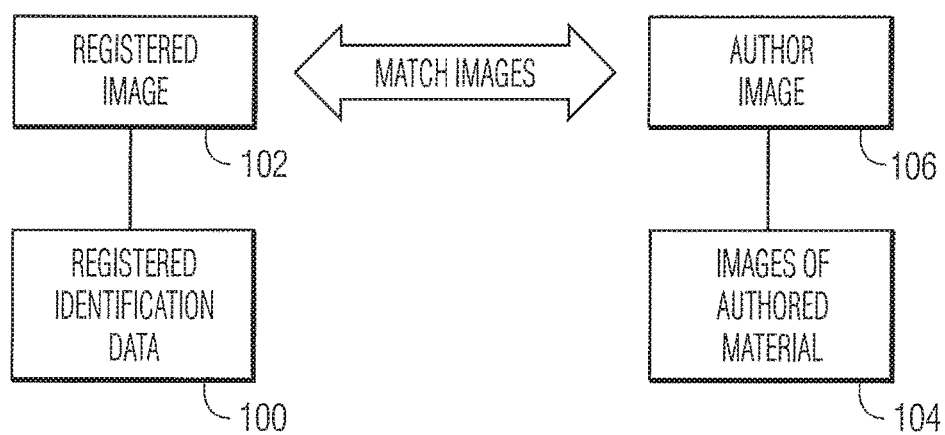
FIG. 1 is a block diagram which illustrates the basic concept underlying one aspect of the present invention.

The preferred embodiments of the invention will now be described with reference to FIGS. 1-29B of the drawings. Identical elements in the various figures are identified by the same reference numerals.

FIG. 1 shows the conceptual basis of one of the inventions herein. In order to prove who the author of a document is (i.e. to prove the identity of an author of a document), the following three links are established:

1) At a registration event: a link between the name of the author (and/or other author identification data) 100 and a video image 102 that identifies the author;
2) At an authorship event (the time an author produces an original document): a simultaneously recorded image of
   a. the document as it is being authored 104, and
   b. an author image 106, i.e. an image of an identifiable feature of the author; and
3) At a verification event (a time when verification of the author identity is confirmed): a determination that the registered author image 102 is substantially identical to the author image 104 which is recorded at the time that the document is authored.

The registration event links 100 and 102; the authorship event links 106 and 104; and the verification event links 102 and 106. The net effect, symbolically is:

100←→102←→106←→104

... thereby establishing that the author is the same person as a registered person.

The document may be one of many types in which there needs to be certainty about the identity of the person who signed it, who authored it, or who indicated his or her thought(s) by one or more writings or keyboard entries. Examples include, but are not limited to:

a) a financial matter which requires a verified signature, such as a check, a loan application, a promissory note, a funds transfer, etc.;
b) a test, in which the test taker answers questions to demonstrate mastery of certain matters;
c) an original work—literary, scientific, artistic, musical, etc.
d) a vote—in a government election, a shareholder matter, etc.
e) a medical record—including an entry by a physician or nurse, a signature on a "do not resuscitate order"; a signature (by a patient or physician) on a document indicating that informed consent was obtained;
f) a legal document; such as a contract, a death certificate; a court document; a will; and
g) a political document such as presidential signature on a legislative bill, a treaty, etc.

The term "author" is intended to include each of the types of person listed in a)-g) hereinabove; and in general is anyone whose identity is to be linked to an observable event. This identity may be a name, a social security number, a medical license number, etc. The observable event generally refers to events which may be seen; But embodiments of the invention which involve only video data, or only audio data (e.g. verification of a speaker or singer) are possible. The events which may be seen include writing using a pen, pencil etc. on a piece of paper, using a virtual pen to write on a touch sensitive screen, selecting a choice from a menu using a touch sensitive screen; using an actual keyboard, and using artistic tools to create a work of art.

Figure 2:
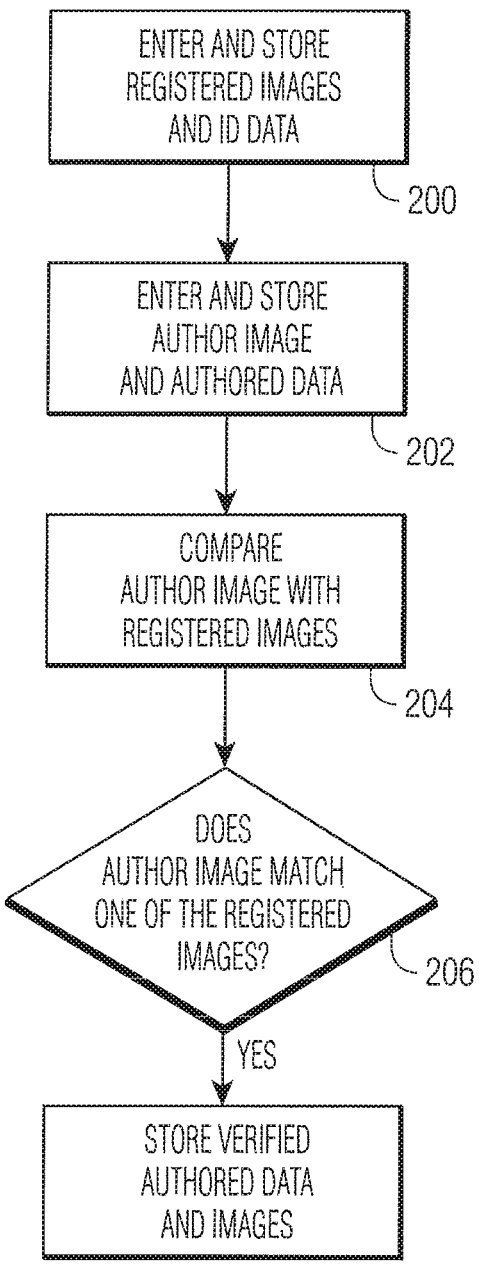
FIG. 2 shows a flow diagram of the steps followed in a first preferred embodiment of the invention.

FIG. 2 is a flow diagram which parallels the conceptual schematic of FIG. 1. It shows one possible sequence of events by which the 3 aforementioned linkages may occur which link the name of an author to the authored material. First, a registration process 200 ensues, in which a link is established between "ID data" i.e. a person's name or other identifier (e.g. social security number) and registered images, i.e. a unique visual image of that person (e.g. the face, one or more fingerprints, an iris pattern, a retinal blood vessel pattern, a palm print, signature, etc.). For the registration to occur, a person—the "registrar"—must indicate that they accept the link between the ID data and the person's image. The process may be similar to an appearance before a notary public, but it could be (i) simpler (e.g. self identification), more (ii) complex (e.g. requiring multiple witnesses, and/or requiring confirmation of one or more biologic identifiers (e.g. fingerprints) from a data bank of such biologic identifiers).

Once the registrar accepts the association between the ID data and the registering person's image, the data-image pair is stored as a computer file in a database. The image of the data-image pair is then considered to be a registered image. A database may hold:

a) one or multiple registered images of one person;
b) registered images of multiple persons (which may include one or more images for each such person).

At block 202, at a time later than the registration process, an author (as defined hereinabove) who has previously registered (by the process indicated hereinabove) and who wishes to have his (male pronoun used hereinbelow without any intention of the choice indicating a preference, limitation, or advantage) identity confirmed, produces a document while simultaneous images are obtained showing:

(i) the authored data, i.e. the actual writing as it is being produced, or (ii) keystrokes as they are being registered (on either an actual or virtual keyboard); and
(ii) the author image, i.e. an identifiable biologic feature of the author.

In one preferred embodiment of the invention, the camera which captures the authored data also captures—within the same image—the author image. For example, the camera may be situated so as to capture both the face and the hands of the author, with the portion showing the hands also showing the written material/keystrokes in enough detail to identify its content. Ideally the camera would also show enough of the body region between the face and the hands, so that it was clear that the face and the hands belonged to the same person.

An example (discussed hereinbelow) which clearly demonstrates textual material and author identification in a single image, uses a device which shows author fingerprints, as the author makes keyboard entries.

In another preferred embodiment of the invention, two separate cameras may be used: one to capture the image of the biologic identifier, and one to capture the image of the textual material. The two images may stored as separate files with a secure label for each file, indicating the time and location of each image (to thereby allow for the conclusion that the two were recorded in essentially the same space and time); Alternatively, the two images may be merged into a single file, by techniques known in the art.

At block 204, the author image is compared with either (i) the registered image of the person believed to be the same person as the author; or (ii) some or all of the registered persons, if the identity of the author is either unknown, or substantially uncertain.

At block 206, a determination is made as to whether the author image and a registered image are a match. The definition of a match is further discussed hereinbelow in conjunction with FIG. 3. If a match is present, block 206 leads to block 208, and the authored data and images are labeled as verified, and stored as verified.

Figure 3:
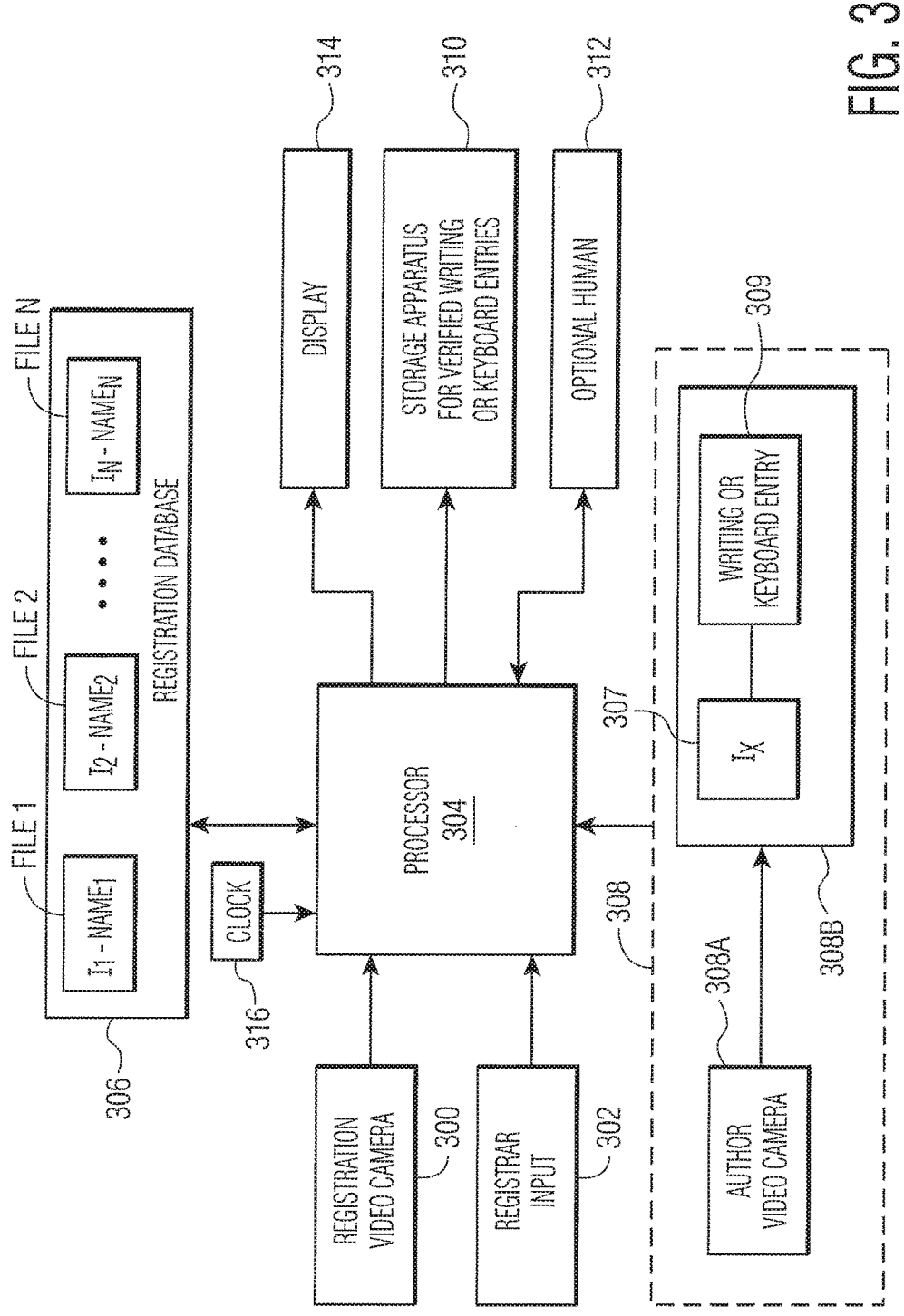
FIG. 3 shows a block diagram of the apparatus in said first preferred embodiment of the invention.

FIG. 3 shows an example of apparatus which performs the functions of the invention described herein. Registration video camera 300 allows inputting of images of a biologic identifier such as a face, palm, fingerprint(s), iris or retinal image, to processor 304. A registrar confirms the name or other textual identifier (the ID data) to be associated with the image from 300, and enters the textual identifier through input 302, to processor 304. 304 produces a file which contains both the ID data and the associated video image, and stores the information as a file in registration database 306. 306 contains multiple files (e.g. FILE 1), each of which contains one person's ID data and that person's identifying image (e.g. $I_1$-$NAME_1$). 306 is preferably maintained in a highly secure environment. Various means to prevent corruption of the data contained in 306 are known in the art. Maintaining multiple copies of the database in different locations, and requiring a match with two or more copies, each in a different location is one means of enhancing the security of the database.

An author wishing to prove his identity, enters video images of (i) his work as it is being produced by him, and (ii) himself, through input device 308. Video camera 308A is used to produce file 308B, which contains simultaneously recorded author image(s) 307 and authored data image(s) 309. In an alternate embodiment of the invention, as discussed hereinabove and hereinbelow, there may be more than one camera 308A. 308B is sent to processor 304, which then compares the author image 307 with one or more registered images in database 306. If a match is found, the author data 309—i.e. the signature, composition, document, etc. produced by the author—is then stored as verified writing or keyboard entries in storage apparatus 310. Storage apparatus 310 may be part of 306, or separate from it.

The comparison of the author image and the registered image may be:

a) performed entirely by processor 304;
b) performed entirely by optional human 312, who views the two images on display 314;
c) performed by processor 304, unless the result of the evaluation by 304 results in a state of uncertainty (e.g. if there is a less than good match between the two images); In this case, the task of comparison may be handed off to human 312. Processor 304 may be pre-programmed to indicate the level of goodness of match required to bypass human 312. Processor 304 may use neural networks to facilitate the process of visual comparison.

If the final decision regarding the comparison is made by the processor, the result may be indicated on display 314. Clock 316 allows for time-stamping of images and of comparisons.

The recording by any of the cameras—either during the registration step or the authoring step—may be of a single image or of a sequence of images (e.g. a video or a "movie"). Hereinabove and hereinbelow, "image" is intended to refer to either one of these cases.

FIG. 4 shows a person 400 using one embodiment of the apparatus shown schematically in FIG. 3. The apparatus shown in FIG. 4 may be used for:

a) registration;
b) entries by an author who wishes to be a verified author; or
c) both a) and b).

In the registration process, person 400 may use the apparatus to input two or more unique identifiers simultaneously, in the same image. For example, 400 may sign his name on 402. 402 may represent:

a) a transparent or semi-transparent surface/paper which allows a signature to be observed and recorded by video camera 404 which is situated below 402;
b) a touch sensitive screen with enough resolution to provide a good quality copy of a signature.

404 may be used to capture both the signature and a) an image of the face, iris or retina of 400; and/or
b) an image of one or more fingerprints, or a palm print of 400, visualized through transparent surface 414.

Alternatively, 404 may capture both a fingerprint/palm print and a signature, without capturing the facial/iris/retinal image.

In yet another embodiment of the apparatus used for registration, multiple identifiers may be simultaneously captured in the same image using camera 410 which is situated behind and, if necessary, somewhat to the side of (or above) person 400, and may be pointed at mirror 412. With proper placement of 410 and 412, and proper angulation of 412, camera 410 may visualize both:

a) the signature of person 400 on 402 (which need not be transparent or semi-transparent in this case); and
b) the face/iris/retina of person 400.

In yet another alternate embodiment of the registration apparatus, 410 and 404 may both be used to input registration information. Each may be used to input the type of information described hereinabove. The information may be stored:

a) as two separate files, one for each camera, with each having associated ID data for the registrant, and each confirmed by the registrar (with each file preferably indicating the presence of additional registration information for the same person in another file); or
b) as a single file.

The information from 404 and 410 may be obtained simultaneously or at separate times.

A simplified form of the registration process would be to enter only a single identifier for 400, e.g. one of the signature, facial image, etc. The apparatus in FIG. 4 could be used for this purpose. Cameras with other locations (e.g. facing 400, or above 400) are also possible. Scanning a signature or fingerprint into processor 304 (of FIG. 3), using a scanner, as is known in the art (and not shown in the figure) is also possible.

Embodiments of the registration apparatus with more than two cameras are possible. The operating principles parallel those of the two-camera case.

The apparatus shown in FIG. 4 may also be used for the entry of the author image and authored data (202 in FIG. 2). In this case, the apparatus is used to simultaneously enter:

a) written entries or touch sensitive screen based entries; and
b) at least one visual identifier of the author (e.g. face, signature, fingerprint(s), etc.).

The mode of operation would be the similar to that described hereinabove for the registration process, except that it may be desirable to enter more text (perhaps a lot more text) than just the author's signature. Furthermore, screen 408 may be viewed by camera 410, and may be used to display either:

(i) textual material in a document that the author is signing; or
(ii) a display of what the author is writing on 402 (as observed by camera 404 or another camera (not shown in this figure) which may be placed above 402). In addition, by angulating mirror 412 so that it shows the author's face, and by properly angulating 408 and 412 and properly positioning 410, both the face (and/or iris, and/or retina) and the authored data as shown on screen 408, may be recorded in a single image by 410 (or in each of a series of images recorded by 410).

Figure 5:
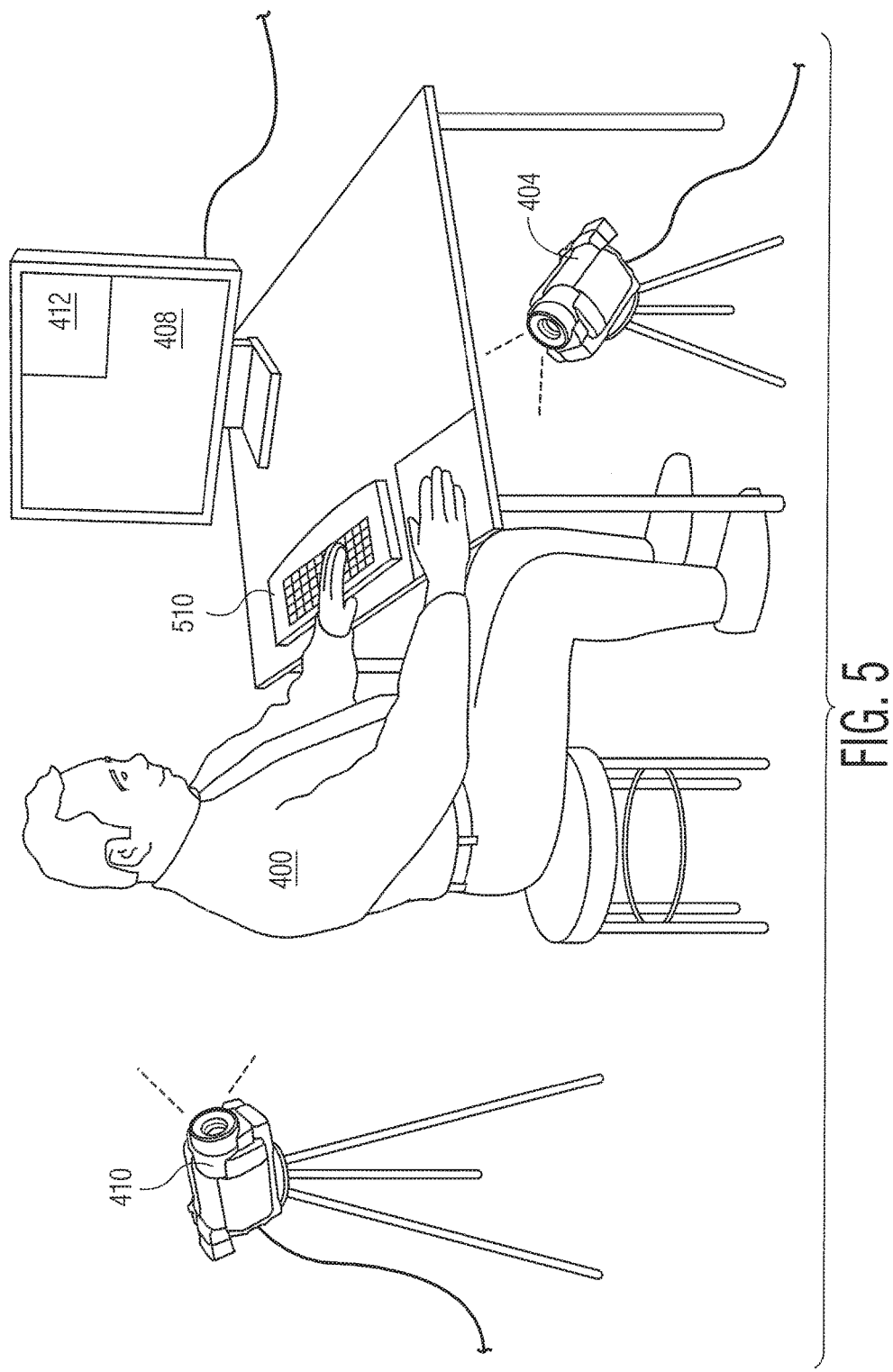
FIG. 5 shows another representational diagram of an apparatus for registration and author data and image capture.

FIG. 5 shows a version of the apparatus similar to that shown in FIG. 4, except that writing surface/touch sensitive screen 402 has been replaced by keyboard 510. All of the specification in conjunction with FIG. 4 is applicable to the apparatus shown in FIG. 5. If 510 is a conventional keyboard, then keyboard entries will not be seen from camera 404; They will be viewable from 410, with a proper geometric arrangement of 410, 408 and 412, as discussed hereinabove.

In an alternate embodiment of the invention, a largely transparent keyboard could be used for 510. This would facilitate 404 observing the face of 400.

Figure 6:
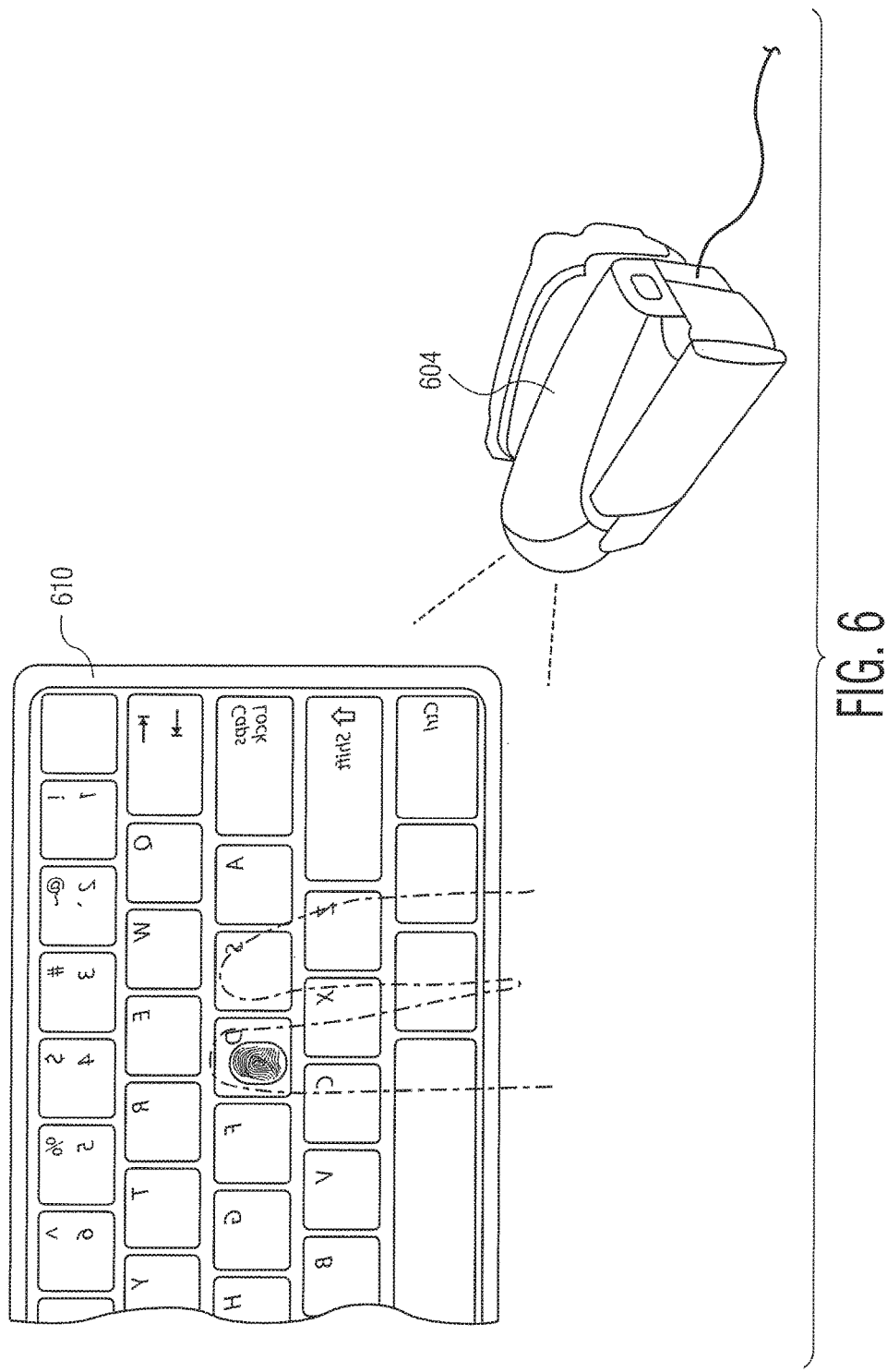
FIG. 6 shows a representational diagram of apparatus which allows for simultaneous viewing of a fingerprint and a keyboard entry.

Furthermore, a keyboard in which the key surfaces are largely transparent—shown in FIG. 6—would allow simultaneous observation of both:

a) the author's fingerprint, and
b) the sequence of selected keystrokes.

In the figure, camera 604 is positioned underneath keyboard 610, to show both fingerprints and keystrokes in each image.

Figure 7:
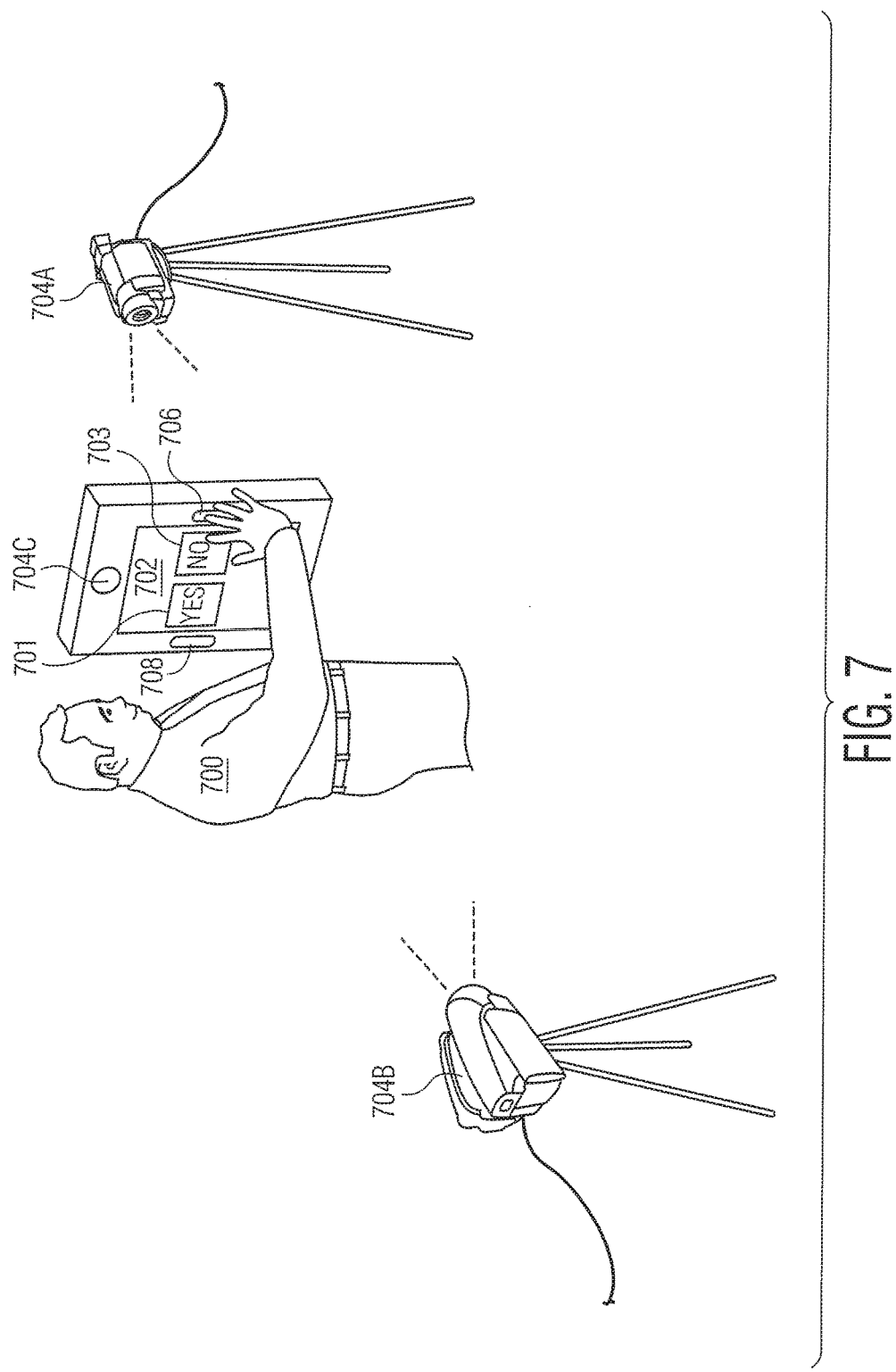
FIG. 7 shows a representational view of apparatus for simultaneously recording a fingerprint and a choice on a touch sensitive screen, containing three video cameras.

FIG. 7 shows another embodiment of the invention which allows for the simultaneous viewing by a single camera of (i) a biologic identifier of an individual making a choice, and (ii) the choice. In this case, the choice is indicated by the individual by his selection on a touch sensitive screen 702. In the figure person 700 has the option of indicating either a "yes" or a "no" choice. As shown in the figure, he may indicate "no" by touching touch sensitive box 703. As he does so, he simultaneously touches fingerprint identification apparatus 706 with another finger. The documentation that the fingerprint recorded by 706 comes from the same individual as the "no" choice may be accomplished by:

a) a camera 704A located behind the transparent or semitransparent touch sensitive screen which records an image which shows each of (i) the finger touching the "no" choice box, 703, (ii) the contiguous parts of the hand lying between the finger which selects the touch sensitive region and the finger which is the source of the print, and, optionally (iii) the fingerprint itself, viewable through 706; and b) a camera 704B which is located behind the individual, and records the selection of the "no" choice at the same moment that the fingerprint is visualized by 706.

In the case of a "yes" choice, the functioning of the apparatus is analogous to its functioning for a "no" choice: The left hand of 700 may be used to simultaneously touch fingerprint identification apparatus 708 and touch box 701 on the touch sensitive screen.

Apparatus similar to that shown in FIG. 7 with two choices other than "yes" or "no" will function in an analogous manner to that described hereinabove. Apparatus with more than two choices will also function in an analogous manner. For example, the right side of screen 200 may contain two or more touch sensitive virtual buttons, each associated with an adjacent fingerprint scanner. In an alternative embodiment of the invention, the hand which is the source of the fingerprint need not be the source of the choice selected on the touch sensitive screen. What is required is that there be visual evidence that the individual who makes the touch sensitive screen selection is the same individual as the one who is the source of the fingerprint; This may be accomplished by camera 704A alone, or by 704A in conjunction with either (i) 704B, (ii) camera 704C, which faces the individual, or (iii) 704B and 704C together.

Figure 8:
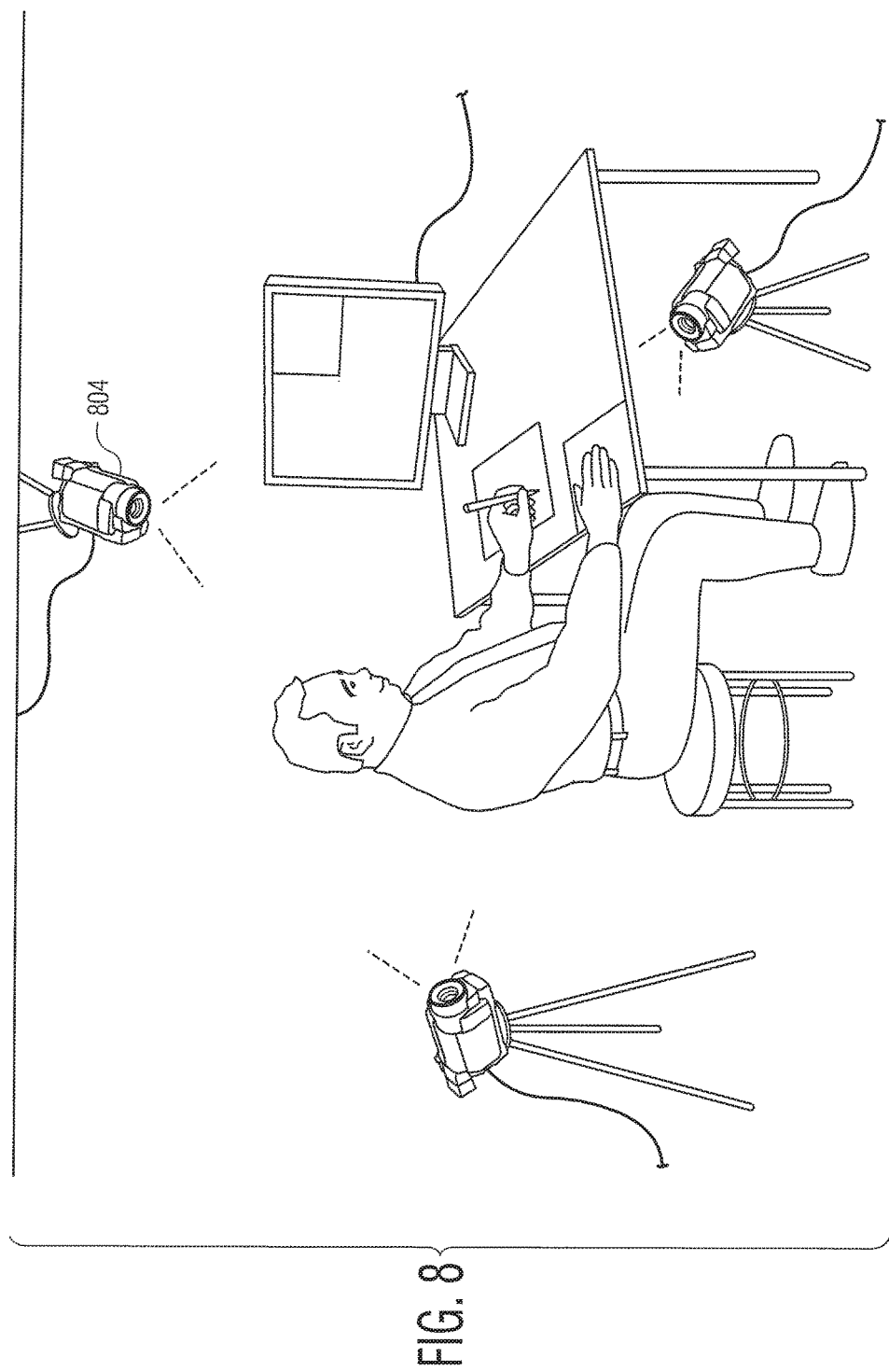
FIG. 8 shows a representational diagram of an apparatus for registration and author data and image capture, with an overhead camera.

FIG. 8 shows an example of apparatus similar to that of FIG. 4, with the addition of ceiling mounted camera 804. The purpose of the overhead camera is to simultaneously visualize both the face of the author of the writing and the writing itself. The camera need not be ceiling mounted, and could be in a variety of locations. The individual need not be writing, and could be using either a keyboard or a touch sensitive screen.

Figure 9:
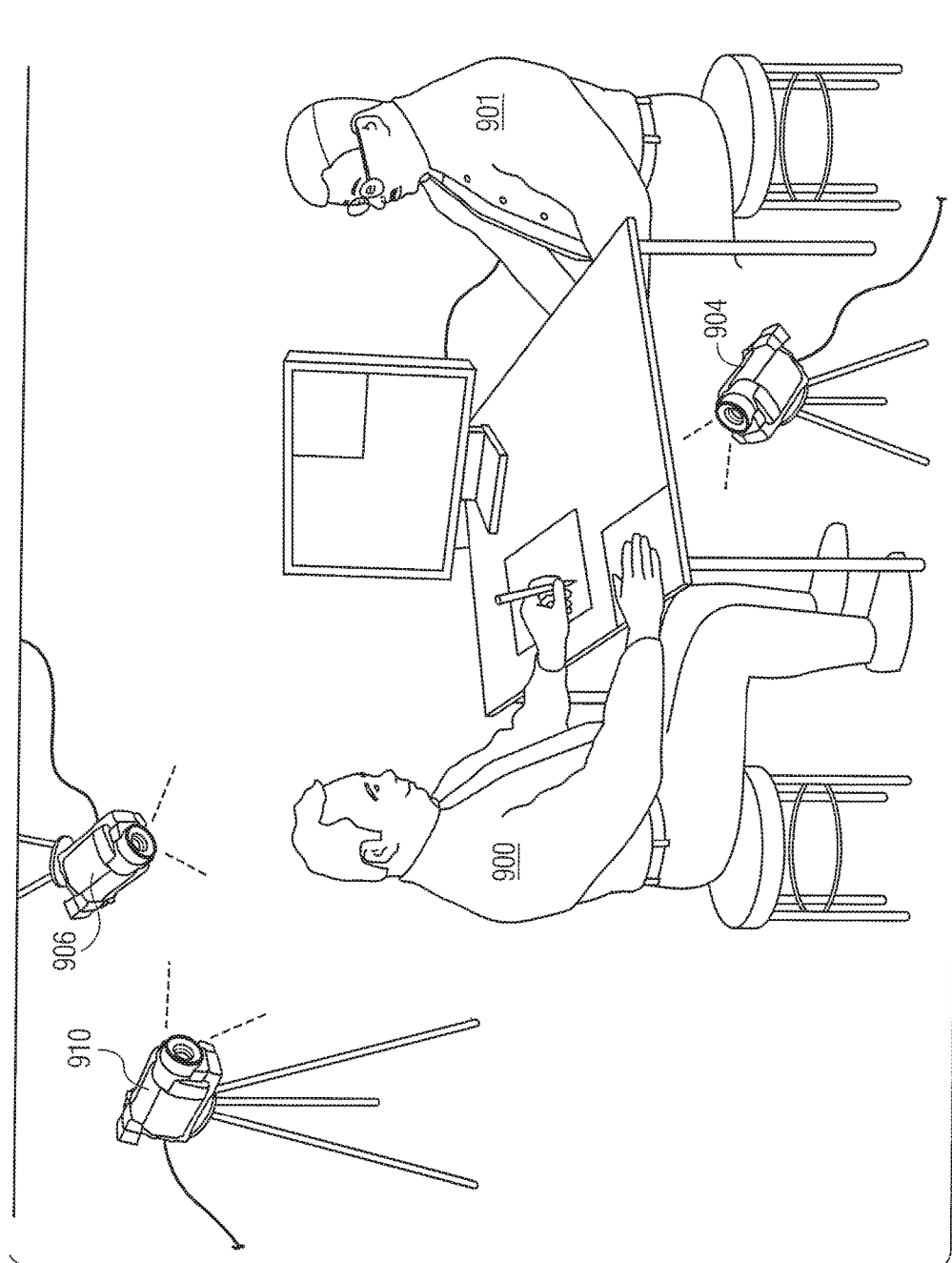
FIG. 9 shows a representational diagram of an apparatus for registration and author data and image capture, with an overhead camera and a witness to the process, whose image is also to be captured.

FIG. 9 shows the same apparatus as that of FIG. 4 with the addition of a witness 901. In one version, the witness functions as a conventional witness, i.e. he may sign a document indicating that he witnessed the writing by person 900. In another version, he may, exchange places with 900, after 900 completes his writing, and the same process (as is described in the specification hereinabove in conjunction with the apparatus shown in FIG. 4) which records one or more images of 900 may then record one or more images of 901 as he signs indicating his witnessing. In conjunction with the aforementioned two versions, the functioning of camera 904 is analogous to that of 404 in FIG. 4, and the functioning of camera 910 is analogous to that of 410 in FIG. 4. Preferably person 901 is a person who has previously undergone the registration process described hereinabove, so that his being an identifiable witness is established. In a preferred embodiment, an identifying image of the witness is captured within the same camera image as at least one of (i) an identifying image of the writing person 900, and (ii) the written material. A variety of camera locations and orientations, and, if desired, mirror location(s) and orientations may be used to accomplish this task; Cameras 906 and 910 illustrate two possible camera locations for this task.

Figure 10:
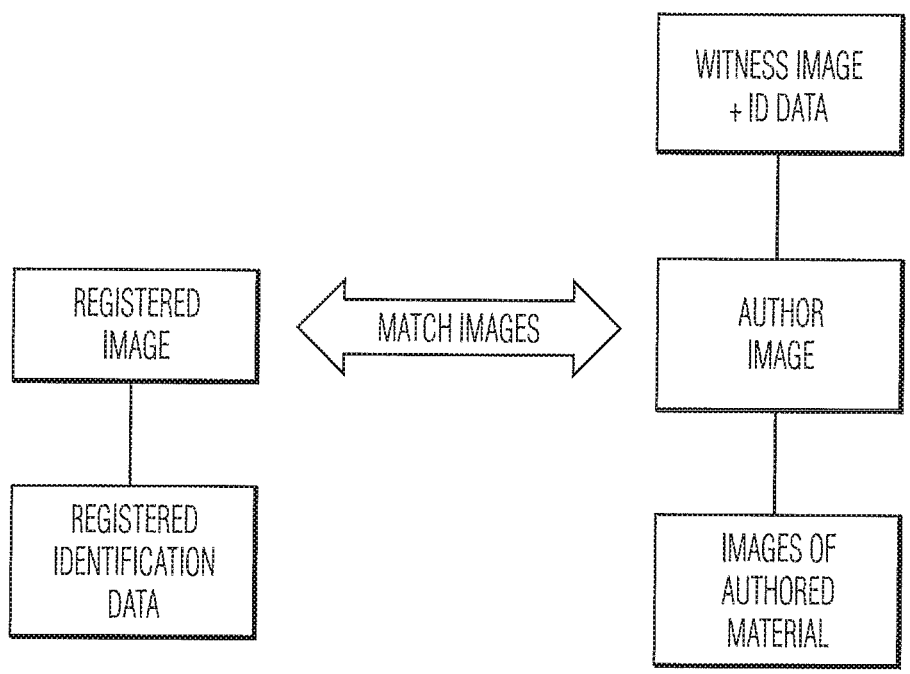
FIG. 10 shows a schematic diagram which illustrates the concept underlying the invention when the image of a witness is captured at the time of the authoring step.

FIG. 10 shows a conceptual schematic, analogous to FIG. 1, which indicates the role of the witness in enhancing the robustness of the identification system. By including within one image:

(i) the authored material;
(ii) the author image; and
(iii) the witness image;

a highly verifiable and very difficult to corrupt/hack, system is the result. If in addition (not shown in the figure), the witness is also a person who has been registered by the same process that the author has, an even greater degree of hardening of the system is the result.

Since the registrar has the role of matching the ID data and the registered images, the robustness of the system will depend on the reliability of the registrar. Various methods of enhancing registrar reliability are possible including having multiple registrars, each of whom reviews the correctness of a paired ID data-registration image set. Yet another method of security enhancement would be to have super-registrars, i.e. people with a high level of security clearance who are responsible for registering ordinary registrars.

Figure 11:
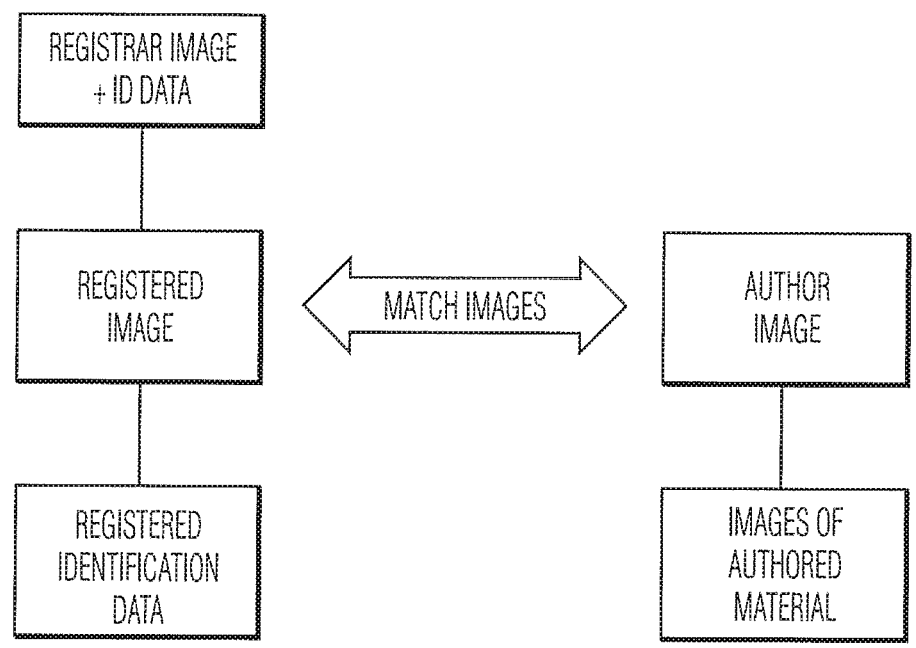
FIG. 11 shows a schematic diagram which illustrates the concept underlying the invention when the image of a registrar is captured at the time of the registration step.

Another method of enhancing security during the registration step is shown in FIG. 11, a schematic analogous to FIGS. 1 and 10. In this embodiment, the image of a biological identifier of the registrar (obtained with apparatus such as that shown in FIGS. 3 through 6) and the image of the registered person are merged into either a single file or a single image. Alphanumeric identification of the registrar would be included in the composite file.

Figure 12:
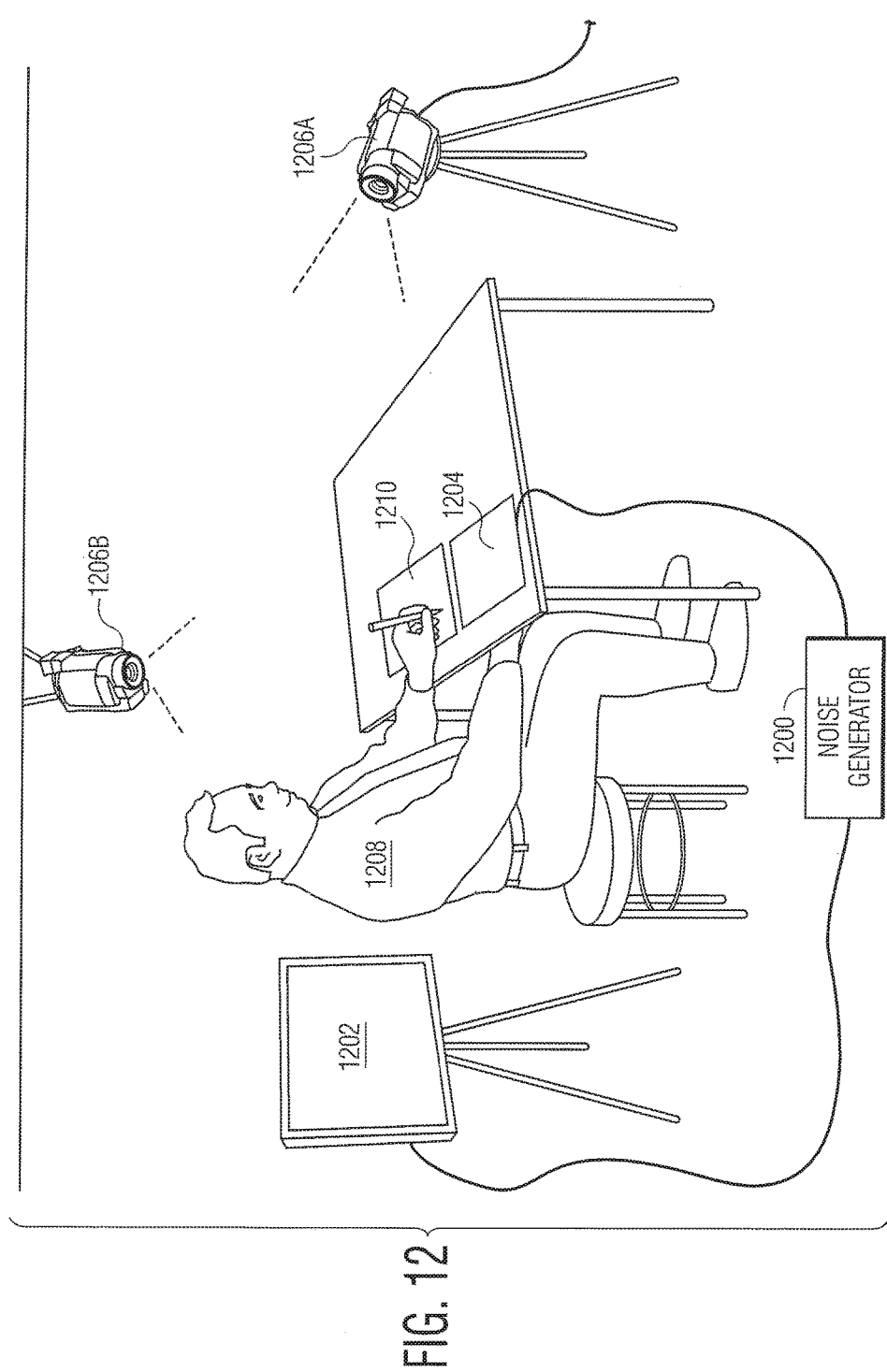
FIG. 12 shows a representational diagram of apparatus for using two identical representations of noise on each of two video screens to document that the recordings of two different cameras have been performed simultaneously.

FIG. 12 shows a method of demonstrating the simultaneity of recording of two video images on separate cameras. A noise generator 1200 generates a random, highly complex pattern, continuously changing pattern which is identically and simultaneously displayed on video screens 1202 and 1204. These screens are placed so that they may be recorded by a video camera along with the other material to be recorded by that camera. Thus camera 1206A simultaneously records both the face of person 1208 and the highly complex, continuously changing pattern on screen 1202. Camera 1206B simultaneously records the text material 1210 written by 1208 and the complex video images on 1204 (which are identical to the images on 1202). Since the task of duplicating the complex and continuously changing pattern of images displayed by 1202 and 1204 would be extremely arduous, it would make attempting to corrupt one of a pair of simultaneously recorded images (e.g. by substituting a different face), extremely difficult or impossible. 1200 may generate any one of a number of forms of very complex pattern including white noise, other noise, or even a repetitive pattern of extreme complexity.

Figure 13:
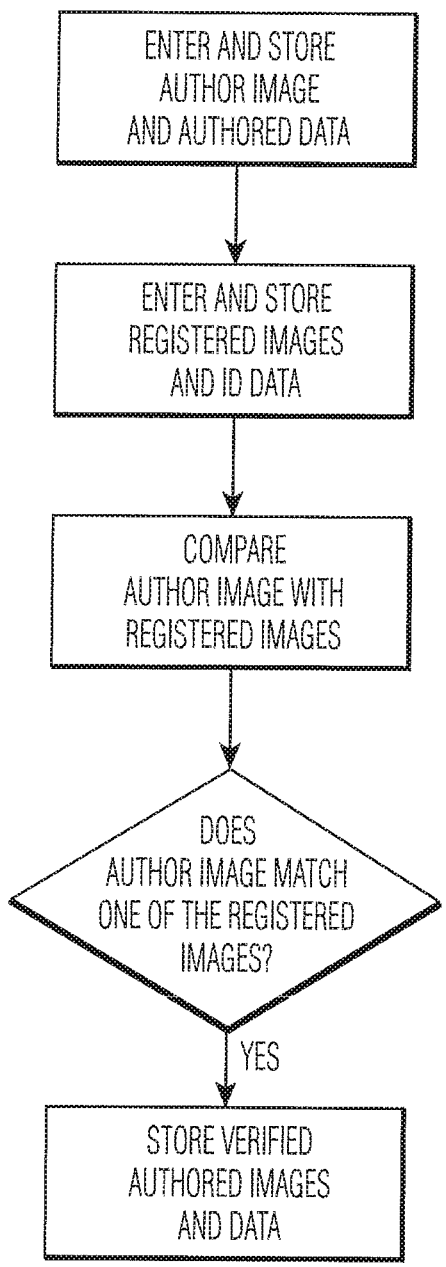
FIG. 13 shows a flow diagram of the steps followed in an alternate embodiment of the invention.

FIG. 13, analogous to FIG. 2, shows a flow diagram of another embodiment of the invention, in which the order of registration (block 200 in FIG. 2) and authorship (block 202 in FIG. 2) is reversed.

The concept of linking a particular person to a particular body of information has, hereinabove, been considered with respect to providing a strong linkage between provided information and the person providing the information. Hereinbelow, the concept and invention is presented with respect to providing a strong linkage between provided information and the person requesting the information. It will be clear that such a strong link will be useful for (a) providing secure communications, (b) preventing access to information stored in a computer memory or other digital device by an inappropriate person, and (c) fee preventing the modification of information stored in a computer memory or other digital device by an inappropriate person.

Figure 14A:
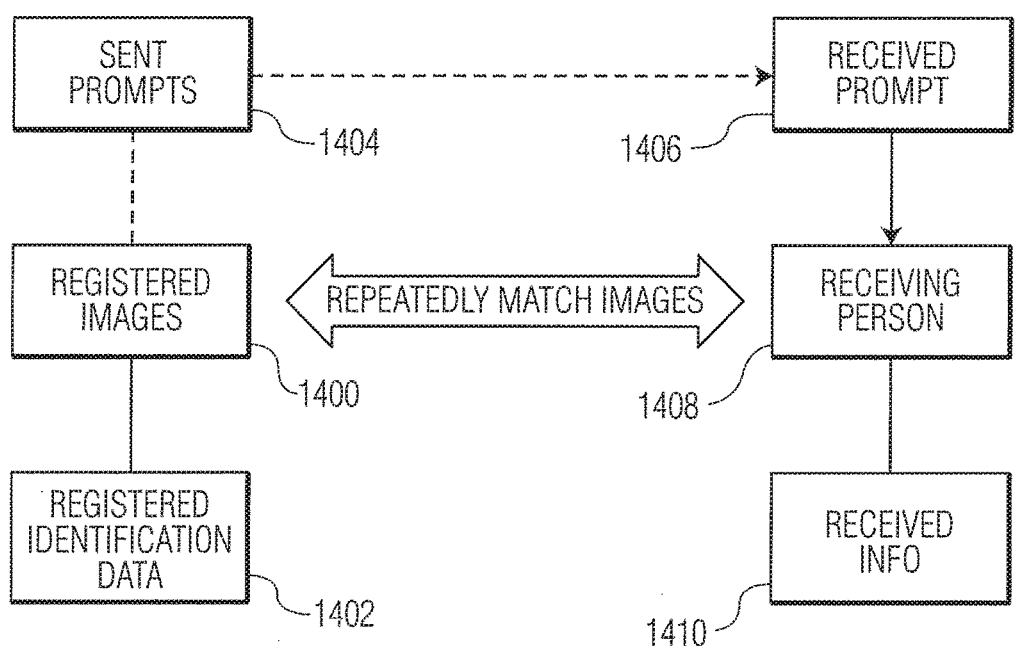
FIG. 14A is a block diagram, similar to FIG. 1, is a block diagram which illustrates the basic concept underlying another aspect of the present invention.

FIG. 14A shows the conceptual basis of an invention which identifies a person requesting to receive information, ("RP") by:

(a) repeatedly examining a biologic feature of the person and comparing it to information in a database which contains files which comprise
  (i) information pertaining to the details of the biologic feature of a registered person, the information having been obtained under a plurality of different conditions, and
  (ii) alphanumeric identification [e.g. name, social security number, date of birth, etc. are also stored in correspondence to the biologic information] of the registered person; and (b) providing a prompt which induces a change in the appearance of the biologic identifier.

By providing a prompt which alters the appearance of the identifier, and by repeatedly observing the identifier, the invention provides a far more secure system than the static approach, known in the art, of simply comparing an image of a biologic identifier ("BI") of a person requesting access to a digital system to file images. An example of the static approach is described in U.S. Pat. No. 8,189,096 to Azar.

Defeating the static approach, i.e. causing a computer or communication system protected by the requirement of providing a static image, entails (i) obtaining and storing a BI image, during a process that is perhaps unknown to the person associated with the BI, and (ii) providing the previously stored image of the BI, at a time when information or computer system access is desired by someone who is not the person associated with the BI [i.e. an inappropriate person ("IP")], but who is in possession of and can provide the information contained in the static BI.

The static system becomes harder to defeat if multiple (static) images must be provided to gain access to the system. But it still may be defeatable by an IP, by obtaining a multiplicity of static images of the BI of a person registered to use the system.

In one embodiment of the current invention, advantage is taken of the ability to change the appearance of a BI upon the request of the person or system providing secure information or desiring secure communication. A simple approach is a voluntary request to the RP to perform a motion which results in a change in the appearance of that person's BI. Examples of such changes include a request to turn the RP's face in one direction or another, to wink one eye, to look to the right, left, up, down, etc. (with or without moving the head) or to move a finger containing a fingerprint in a particular way, or a palm containing a palm print or a pattern of blood vessels in a particular way.

Still other requests may involve moving one part of the body containing one BI so that its relationship with another part of the body containing another BI is geometrically altered. The value of such a voluntary prompt is that the nature and timing of the request is entirely under the control of the information source ("IS"), whether the source is a person or a computational device.

Still other requests may be for the RP to follow a moving point or object on a display screen, using apparatus in which the IS controls the trajectory of the point on the screen, while a camera observes the user eye motion, iris image, retinal vein image, image of blood vessels on the surface of the eye, or facial motion. Although the tracking of such a point by the RP would not perfectly match the apparent motion of the point, software methods to compensate, and statistical techniques to assess a match could be applied as are known in the art. Clearly, attempts by an IP to communicate inappropriately with such a system would be extremely difficult, requiring the IP to very quickly provide a sequence of BI images which match a not previously expected pattern of variance. By making such the choice and timing of prompts random or pseudo random (e.g. by using a variety of techniques to generate such random information including the digitization of white noise, the use of minutae related to sports information [e.g. number of milliseconds between pitches in an ongoing baseball game], stock market minutae [e.g. ongoing trades and their timing], astronomic information [e.g. solar activity], traffic information minutae [patterns of people walking through Times Square], by electronically generating pseudorandom number patterns), the task of the IP becomes more difficult.

Figure 15:
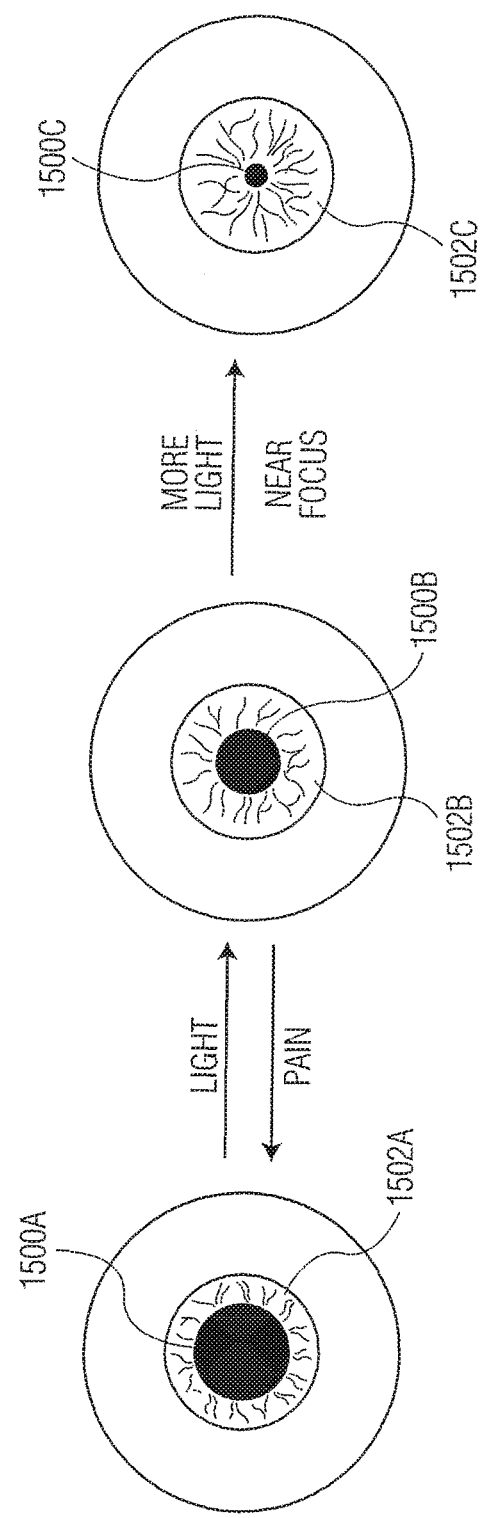
FIG. 15 is a representation of the functional aspect of the human iris.

A still greater burden on the inappropriate person attempting to gain access entails the use of prompts resulting in entirely involuntary physiologic actions. One such example is the application of light to the human eye. As shown in FIG. 15, the pupil 1500A-C, an opening in the iris 1502A-C, constricts in response to light in a graded fashion over a certain range, i.e. more light impinging on the eye causes more constriction of the pupil/"enlargement" of the iris, which in turn is mediated by muscular tissue within the iris. This process causes a change the appearance of the iris. Since the iris is a known biologic identifier, the application of light to the eye will produce a change in the observed biologic identification information. Thus any one individual will have nearly limitless possible iris patterns, which can be obtained by a change in the amount of incident light.

In turn, the extent of incident light may be controlled by apparatus at the information source. Prompts can control the light intensity, the wavelength, the spatial placement of the light, the size of the light source, the number of light impulses, the time interval between impulses, the duration of each impulse, etc. Furthermore, the IS may store prompt details and generate an expected iris response for comparison with an observed one. Furthermore, the IS may generate linear and other combinations of iris images stored in a computer database, thereby potentially expanding the database limitlessly. The IS may also adjust the amount of applied light to attempt to match an iris image on file.

In addition, alteration in iris size may be induced by having the RP change focus from a distant object to a near one (which may be presented on a computer or digital device display screen), or vice versa. In addition, dilation of the pupil/constriction of the iris may be induced by a painful stimulus, which may be applied to the RP under remote control via a device attached to the patient (e.g. one which provides a mild electric shock).

A given induced change in iris image, (i.e. the varying biologic identifier,) may not always occur identically for a given amount of light. The system administrators and architects will overcome this by either (a) storing a variety of responses to each prompt, obtained during a registration period for the person who is to be an authorized user of the system, (b) utilizing linear or other combinations of previously observed responses by a particular user, or (c) by utilizing neural networks to learn the patterns of authorized system users.

The pupil/iris changes, in turn, will change the appearance of another BI, the observed pattern of retinal blood vessels. A constricted pupil narrows the area of the retinal surface (and vascular pattern) available for view, while a dilated pupil has the opposite effect. Thus another embodiment of the invention entrails RP identification using retinal vessels as the BI, with prompts causing a change in iris/pupil geometry which changes the viewable retinal field.

The aforementioned involuntary changes in the appearance of the BIs caused by IS prompts in an essentially unpredictable manner would create a situation that would be extremely difficult for an IP to defeat.

Figure 16A:
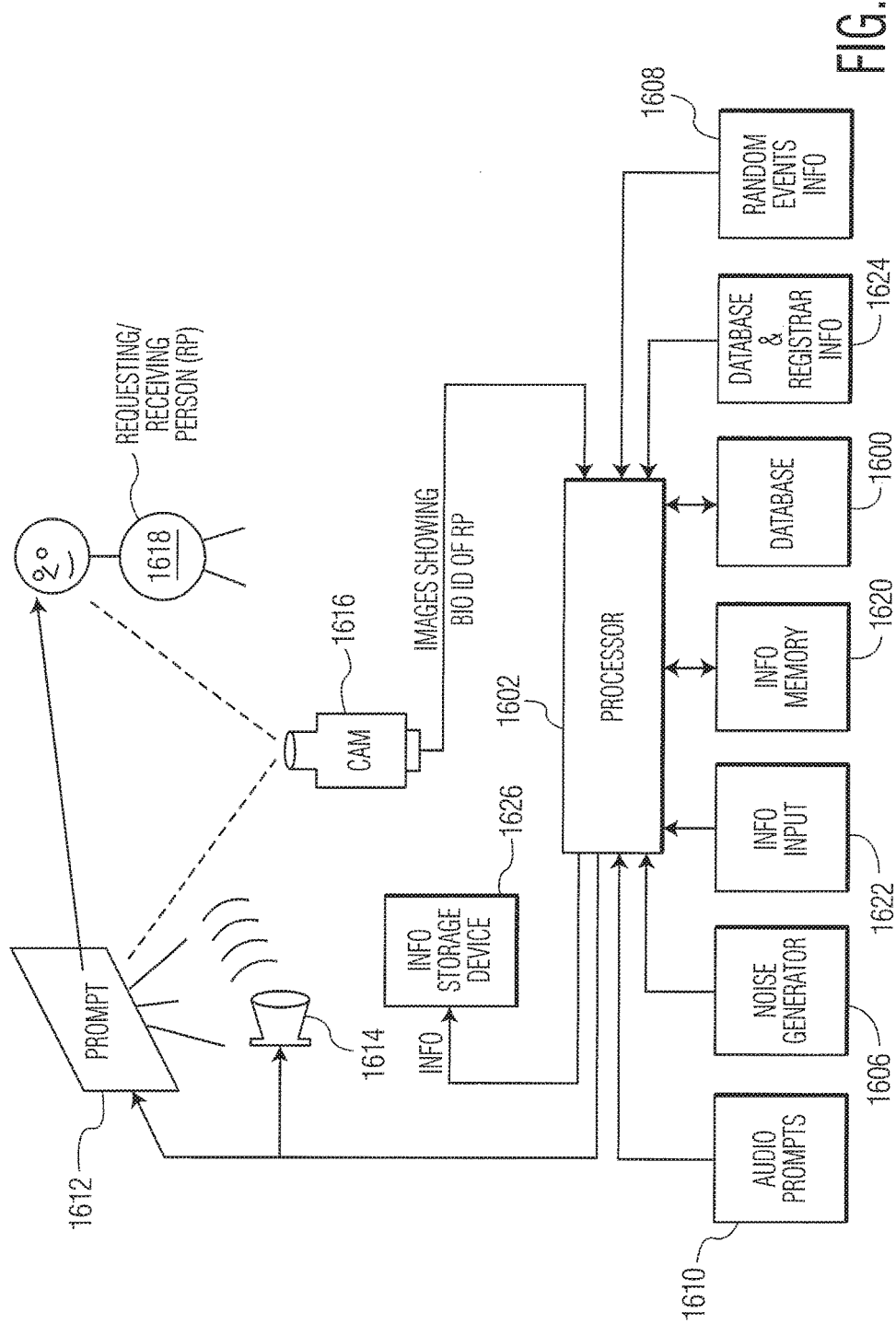
FIG. 16A is a block diagram of apparatus in a second preferred embodiment of the invention.

FIG. 16A shows one embodiment of apparatus for the aforementioned prompt-based security system. AP identifying information is stored in and accessed from database 1600 by processor 1602. Prompts may be generated in a variety of ways, as indicated hereinabove, including the digitization of white or other noise input from generator 1606, the digitization of information related to random or almost-random events inputted at 1608, by a random or pseudorandom number generation program which runs on processor 1602, or by inputted audio prompts 1610. The processor outputs a signal to a prompt generating device, which may be a screen which displays digital information 1612, a sound producing device 1614, a light producing device or a pain producing device. Camera 1616 is oriented to view the biologic identifier (e.g. iris pattern, retinal veins, etc.) of RP 1618 in detail. 1616 supplies data representing repeated images of the BI of the RP to processor 1602. 1602 compares the received data representing these images to the data stored in database 1600. The results of the comparison may be indicated by either (a) a numeric or graphic indication of the degree of correspondence between the 1618—derived images and the database images, (b) an indication that a threshold has been exceeded for declaring a match between the RP and an AP, and/or (c) the allowance of access to information in computer memory 1620. Information is input to 1620 by input device 1622. Information obtained, following the allowance of access, may be stored in information storage device 1626. As indicated hereinabove, the certification that AP information stored in 1600 is indeed correct may be accomplished by utilizing a registrar, i.e. a registration person who is authorized to input information to 1600. This input occurs via input device 1624, which may also input alphanumeric and/or biologic identification information pertaining to the registrar.

Figure 16B:
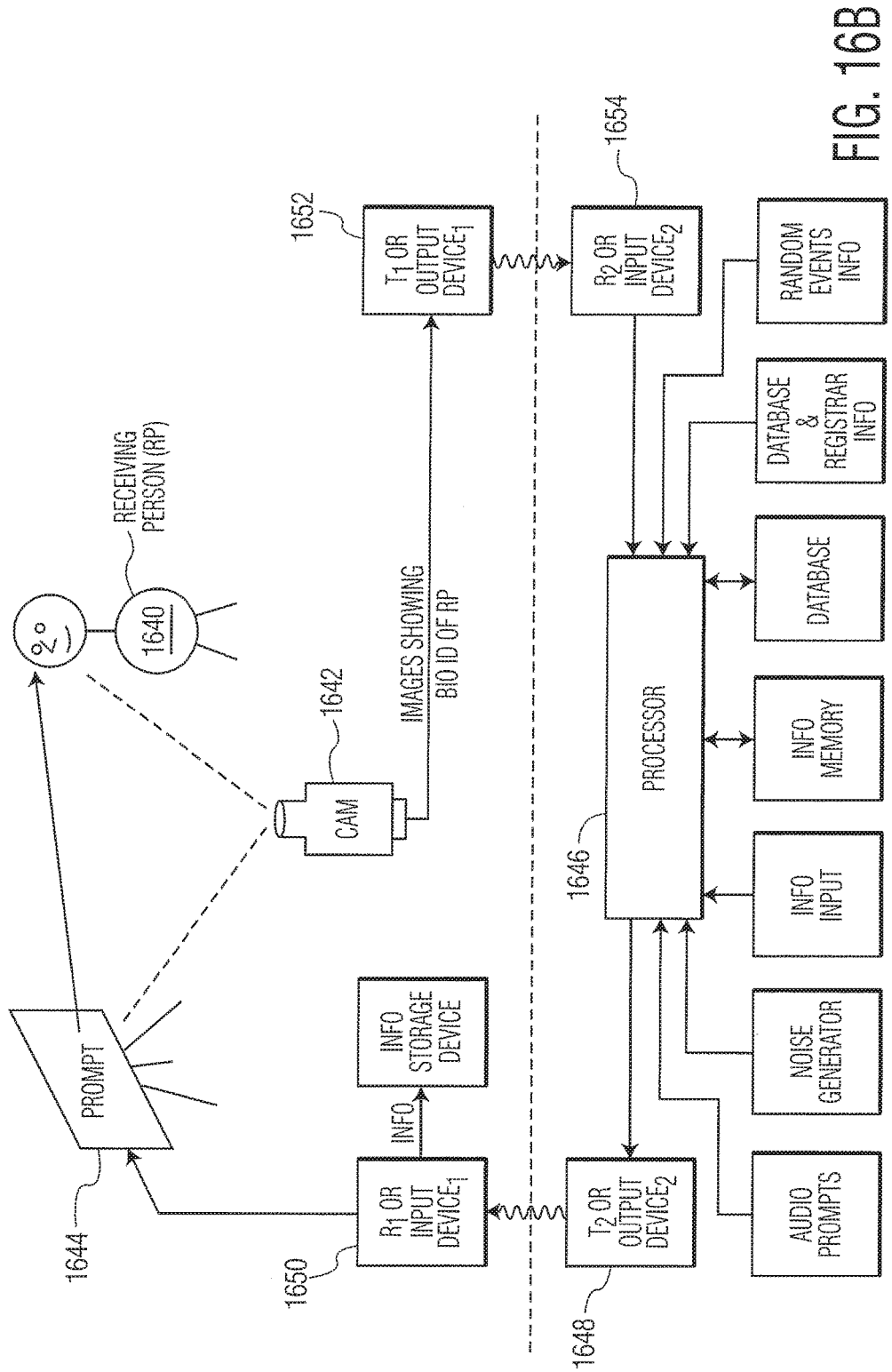
FIG. 16B is another block diagram of apparatus in a second preferred embodiment of the invention.

Whereas for the embodiment shown in FIG. 16A the connections between (i) processor 1602 and (ii) each of camera 1616 and prompt device 1612 comprise a wired connection or a series of wired connections, FIG. 16B shows embodiment of the invention in which camera 1642 and prompt producing device 1644 are in communication with processor 1646 by wireless means. The link between 1646 to 1644 is via transmitting device or output device 1648 and receiving device or input device 1650. The link from processor 1646 to camera 1642 is via transmitting device or output device 1652 and receiving device or input device 1654. 1648 and 1654 may comprise a single transmitting and receiving device. 1652 and 1650 may comprise a single transmitting and receiving device. A wide variety of such communication devices and methods will be known to those skilled in the art. Combinations of wired and wireless links for the system, which embody features of each of FIGS. 16A and 16B are possible as well.

Communication between (i) the processor 1646 and (ii) each of camera 1642 and prompt device 1644 may be by a public or private telephone network, the Internet, a private digital or analog communication network, radiofrequency communication (including the microwave portion of the spectrum, and Bluetooth communication), satellite-based communication, light communication (including infrared and ultraviolet), communication by modulated magnetic fields, and communication by sound, ultrasound, or subsonic longitudinal wave modulation means.

RP 1640, camera 1642 and prompt device 1644 may be situated in a location which is different, and possibly remote from processor 1646, and its associated input devices and memory devices. Such a separation between the corresponding elements of FIG. 16A is also possible.

Each of the remaining elements in FIG. 16B is functionally the same as the corresponding element in FIG. 16A, described hereinabove.

Figure 16C:
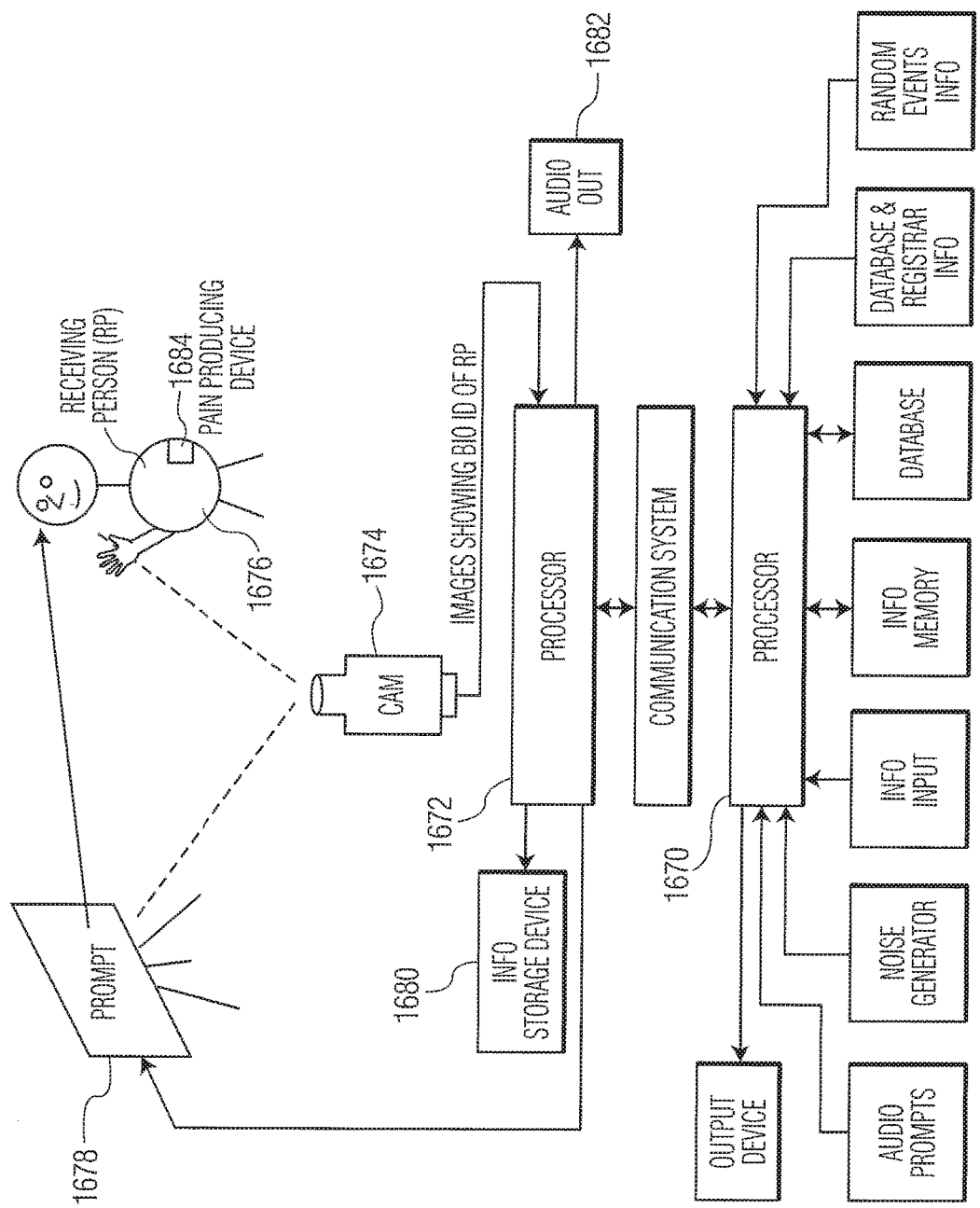
FIG. 16C is a yet another block diagram of apparatus in a second preferred embodiment of the invention.

FIG. 16C is functionally similar to 16B, except the input/output—transmitting/receiving devices have been replaced by a communication system. In addition, each of camera 1674, prompt device 1678 and storage device 1680 are linked to the system via a second processor 1672.

As is known in the art, each processor 1670 (which is analogous to processor 1646 in FIG. 16B) and 1672 will be linked to interface elements, to facilitate the exchange of information with the system. The methods and means of communicating through the system are those stated in conjunction with FIG. 16B. The relative locations of each processor and its linked elements (e.g. camera 1674, in the case of processor 1672), are also conceptually parallel to the situation described in conjunction with FIG. 16B.

Although FIGS. 16A, 16B and 16C each show different means of linking the prompt producing and image analyzing processor (e.g. 1602, 1646 and 1670) to the respective prompt producing device and camera, these figures all pertain to a common invention.

FIG. 16C also shows an audio output device 1682 for delivering audio prompts from input device 1686. It also shows a pain producing device 1684, attached to the body of the RP, which may provide a shock, heat or other noxious stimulus.

Figure 18:
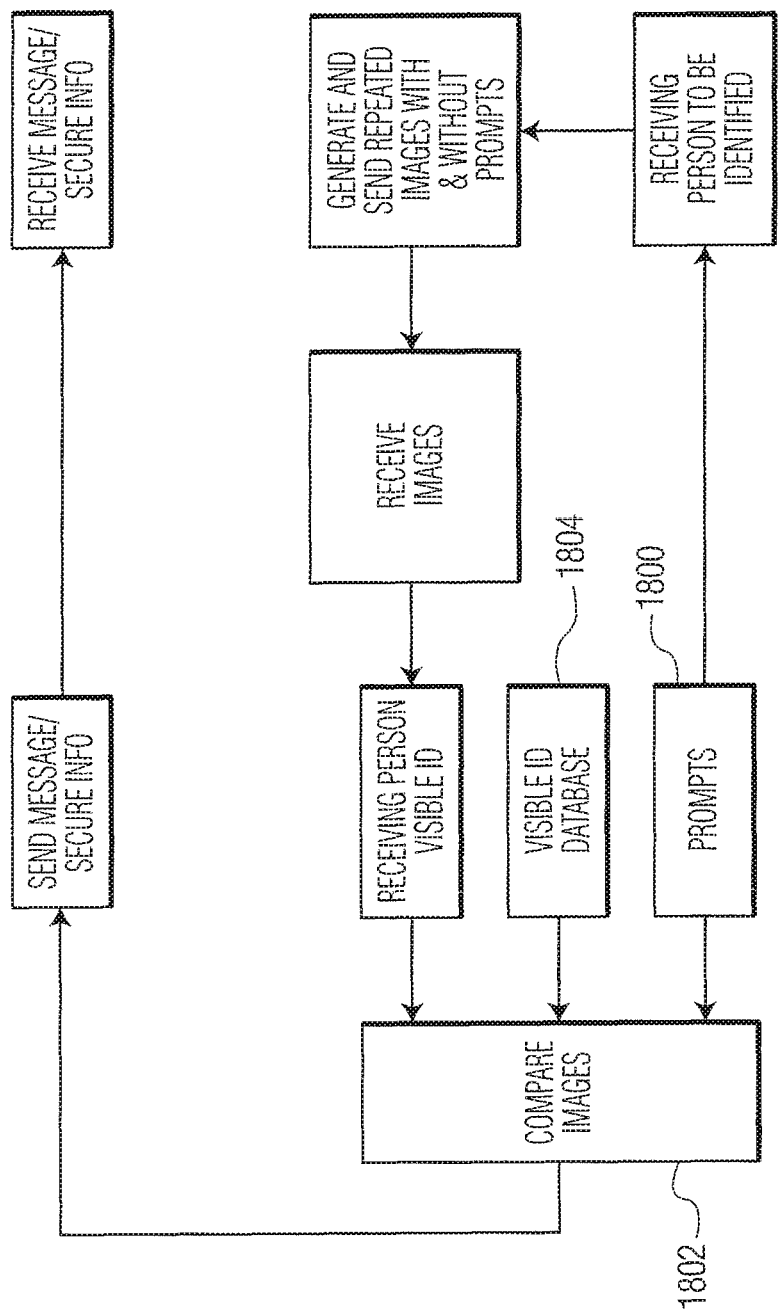
FIG. 18 is a block diagram showing the operation of the apparatus in FIGS. 16A, 16B and 16C.

FIG. 18 shows a block diagram indicating the function of the prompt-based embodiment of the invention. It has been fully described in conjunction with the specification of FIGS. 14A, and 16A-C. The nature and timing of prompts 1800 may be utilized for comparing images 1802, since clearly it would be advantageous for the processor to indicate a proper correspondence between prompt and observed change in BI. For example, the observation of a pupil which dilates in response to a light stimulus, even if associated with observed iris images before and after the stimulus which match those in the database, would call into question the veracity of the identification.

Visible ID database 1804 may also contain biologic ID images which show a body part from a variety of vantage points and angles.

Figure 17A:
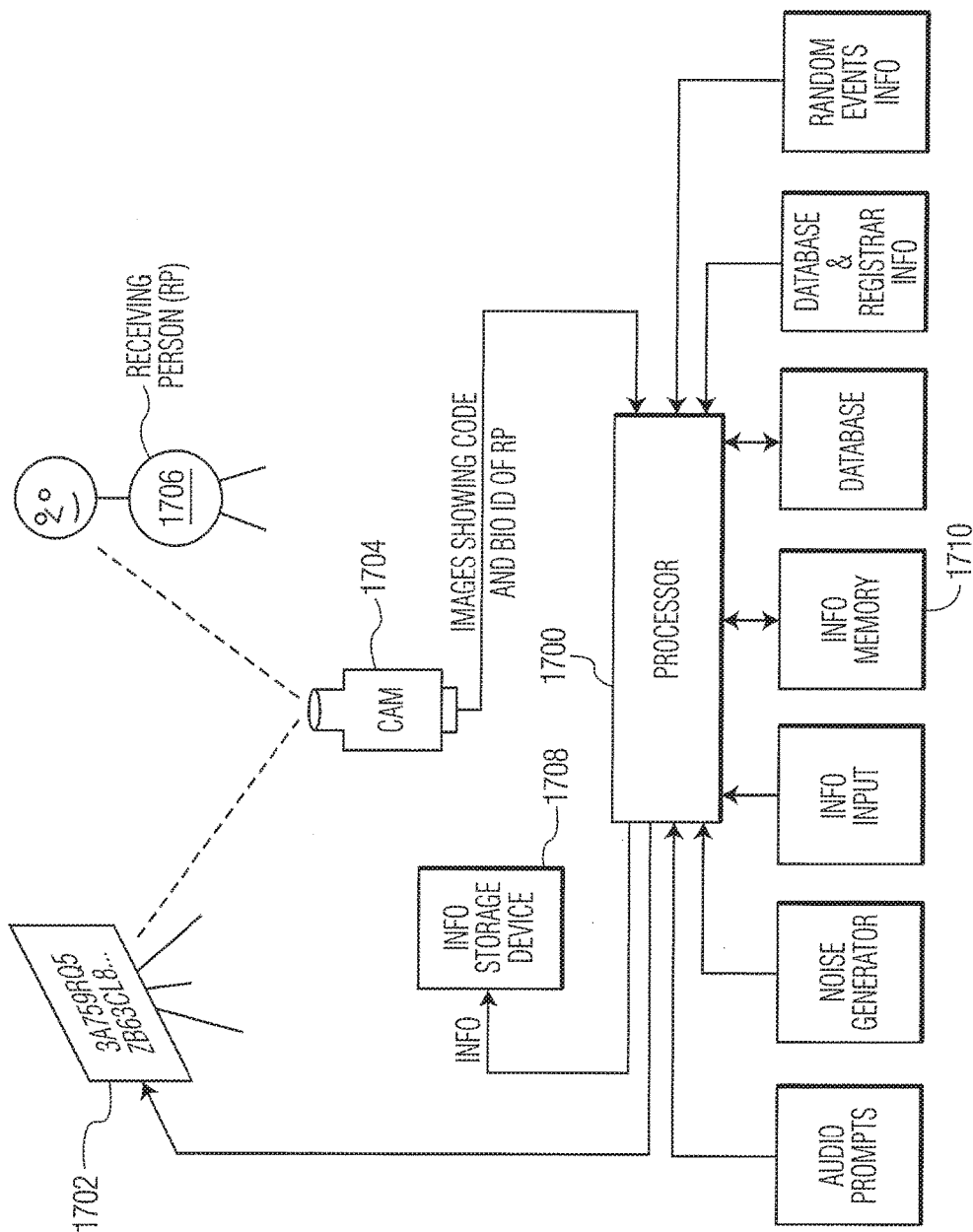
FIG. 17A is a block diagram of apparatus in a third preferred embodiment of the invention.

Another approach to further increasing the security and accuracy of identification of a user, and the location of the user of the system is shown in each of FIGS. 14B, 17A-C and 19. Referring to FIG. 17A, the apparatus differs from corresponding FIG. 16A, in that processor 1700 is operative to generate a code and to produce a signal which causes display screen 1702 to display a visual representation of the code. Camera 1704 is situated to view both screen 1702 and the BI of RP 1706, to produce a composite image containing both the BI and the screen image of the code. Processor 1700, on receipt of the composite image extracts each of the code image and the RP image. It compares the code image with a stored version of the sent code, and it compares the Bio ID image with data in its database. It then can (i) indicate a numerical or graphical presentation of the extent of match of each of the two composite image components, (ii) indicate whether each or both has met or exceeded a threshold deemed to be satisfactory, and/or (iii) allow the passage of information to storage device 1708 from information memory 1710.

It is to be understood that each step in the passage of the information reflected by the code may involve a degree of distortion/degradation of the information. The conversion of the information from digital signal to visual display is one such step, as is the conversion of the screen information to a camera image, and the conversion of the camera image to a camera signal. Further losses of integrity may occur during each limb of signal transmission from and to the processor. Thus the analysis of the received code by the processor, and its comparison with the sent code will result in a less than perfect match even when system integrity is uncompromised. Algorithms for assessing the goodness of fit of the received version of the code information to the sent version will be apparent to those skilled in the art.

The difficulty of having an inappropriate person gain access to processor 1700 is enhanced by including the code component in the composite image: Gaining such access would require the IP to be able to reproduce the BI and reproduce the image of the code, and to do so within a single image. The difficulty of such reproduction is enhanced by rapidly changing the code. Each of the elements (the noise generator, the random outside events information and the processor itself) utilized to generate random and pseudorandom variations discussed in conjunction with FIG. 16A, is utilized in FIG. 17A to generate such variations in the code.

This variation may utilize either a single image of biologic ID/code image or repeated ones. In addition, a prompt producing device and activation means (not shown in the figure), could be added to further augment the degree of security.

Each of the remaining elements of FIG. 17A is analogous to the respective element in FIG. 16A.

Figure 17B:
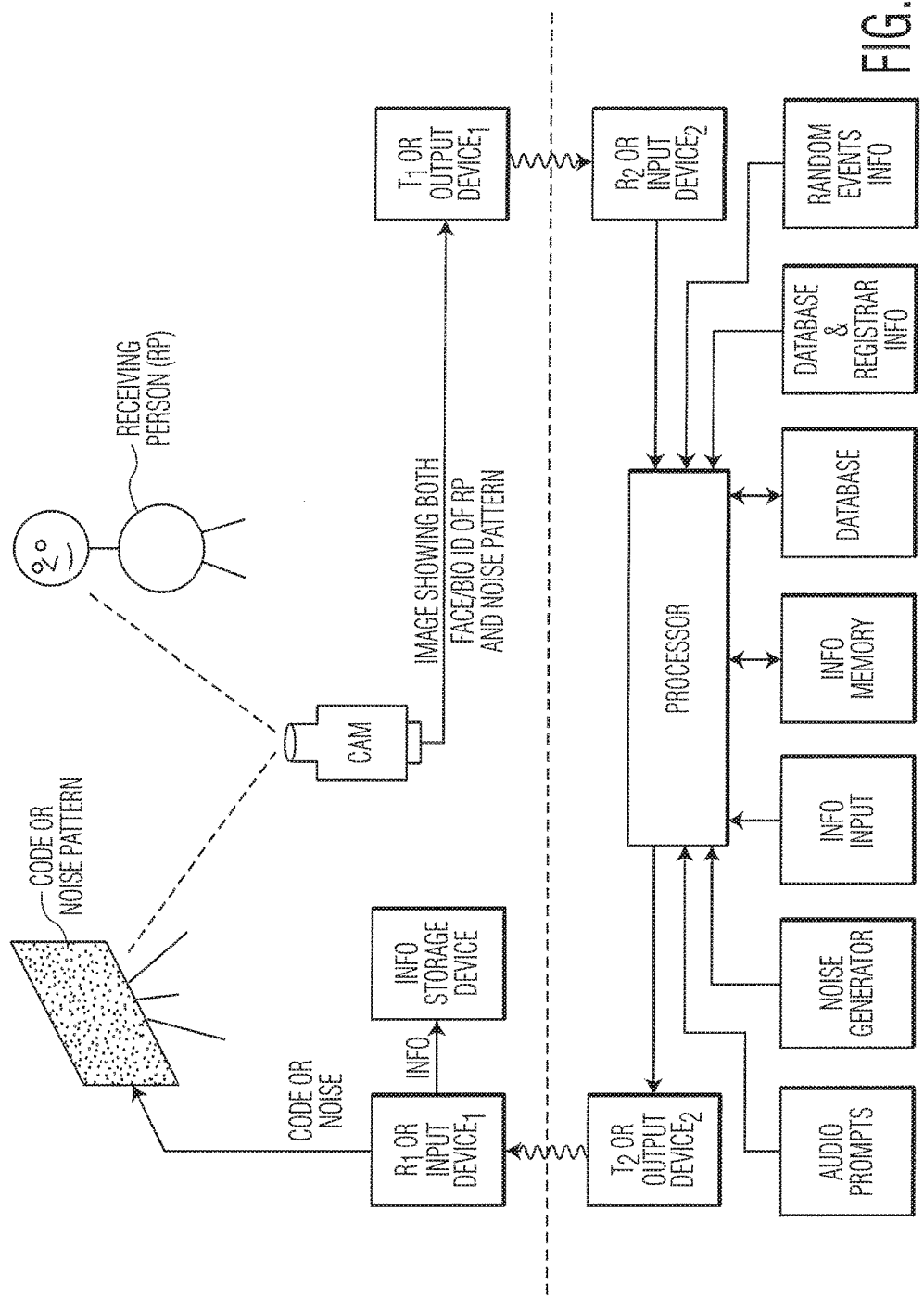
FIG. 17B is another block diagram of apparatus in a third preferred embodiment of the invention.

FIG. 17B is analogous to FIG. 16B, in that both show a wireless means for communicating between (i) the processor, and (ii) the items in the vicinity of the RP (which in the case of FIG. 17B are the camera and the code display screen).

FIG. 17C is analogous to FIG. 16C. It shows the embodiment of the invention with composite images of both code and BI, and a communication system linking the first processor with camera, information storage device and screen via a second processor.

Figure 19:
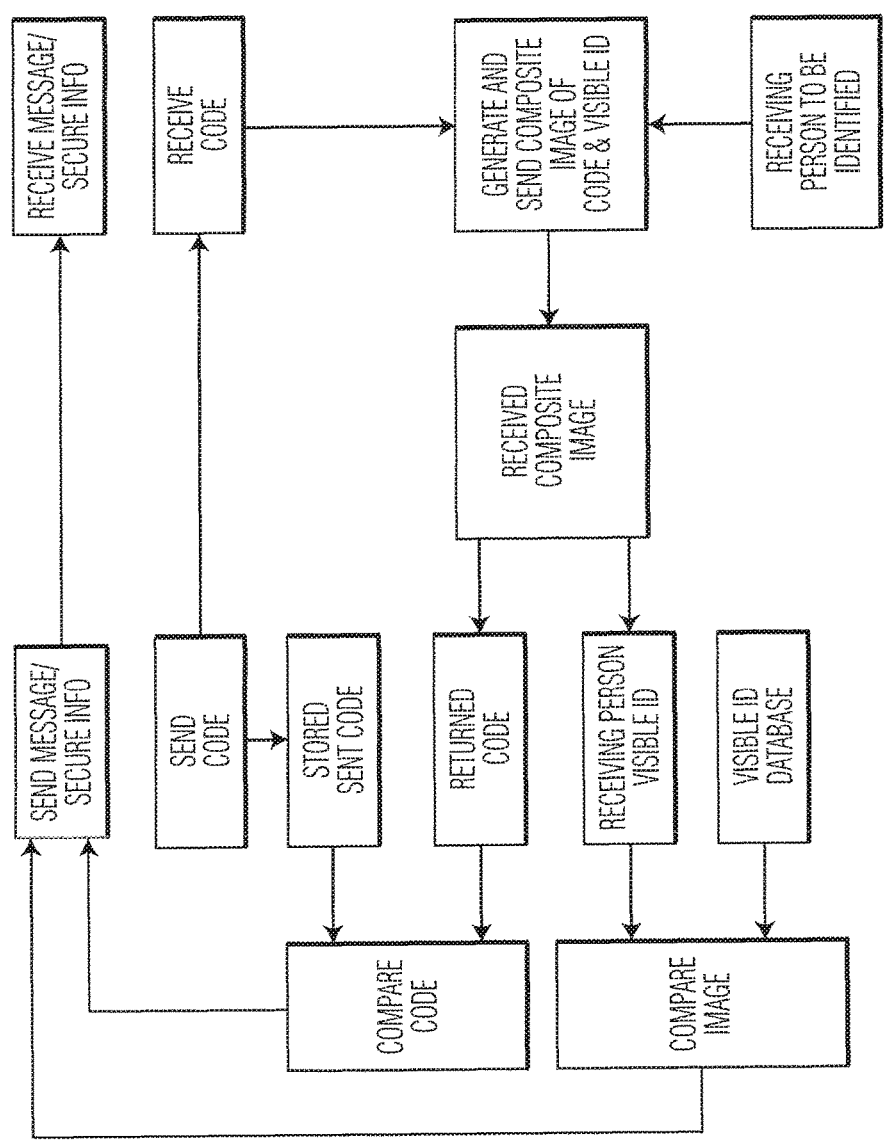
FIG. 19 is a block diagram showing the operation of the apparatus in FIGS. 17A, 17B and 17C.

FIG. 19 shows a functional block diagram of the operation of the apparatus in FIGS. 17A-17C. The block diagram is analogous to that of FIG. 18, for the prompts version of the invention.

Figure 14B:
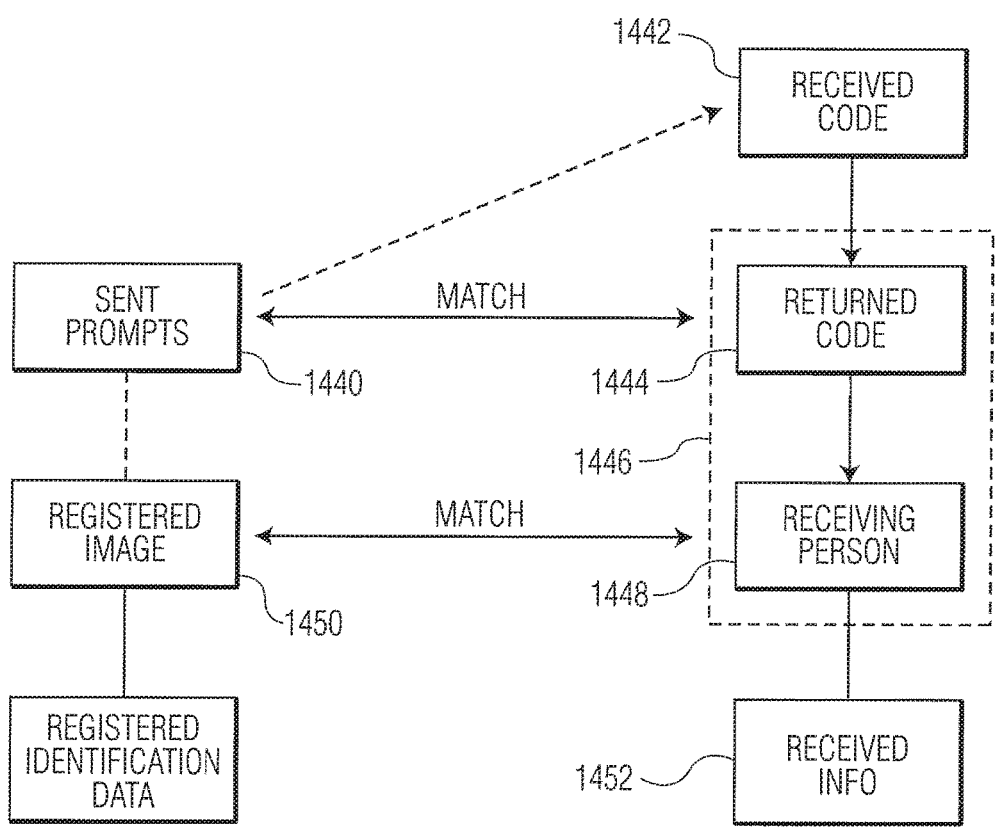
FIG. 14B is a block diagram, similar to FIG. 14A, is a block diagram which illustrates the basic concept underlying yet another aspect of the present invention.

FIG. 14B shows the conceptual basis of the composite image in the visualized code version of the invention, and is analogous to FIG. 14A for the prompts version of the invention. Sent code 1440, arrives at the RP site as received code 1442 and is incorporated into composite image 1446 and is extracted from the image as returned code 1444. The information in 1444 is compared with that of 1440, to assess the extent of match. In addition, the extracted bio ID image 1448 is compared to the database image 1450. If the comparisons are satisfactory, information may be received 1452 by the RP.

Figure 20A:
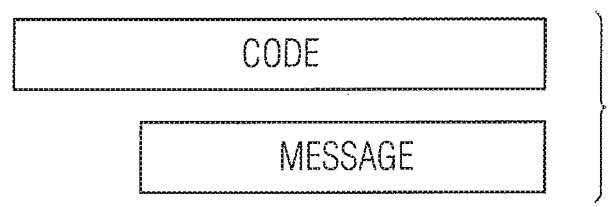
FIGS. 20A and 20B are schematic diagrams showing the composition of information sent to a receiving person.
Figure 20B:
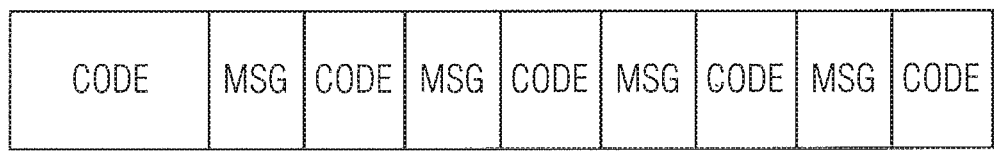

FIGS. 20A and 20B show schematic representations of how code and message may be arrayed, for versions of the invention which use the code matching procedure. In both figures, the transmission of code precedes the transmission of a message or information containing secure information. In FIG. 20A, once a period of code transmission indicates a satisfactory information exchange, the message and code are each transmitted in parallel fashion. Any interruption in code match results in interruption of the message. In FIG. 20B, the process is incremental: a code segment is followed by a message segment; then the process repeats. A failure to match properly at any point results in interruption of the message.

Figure 21A:
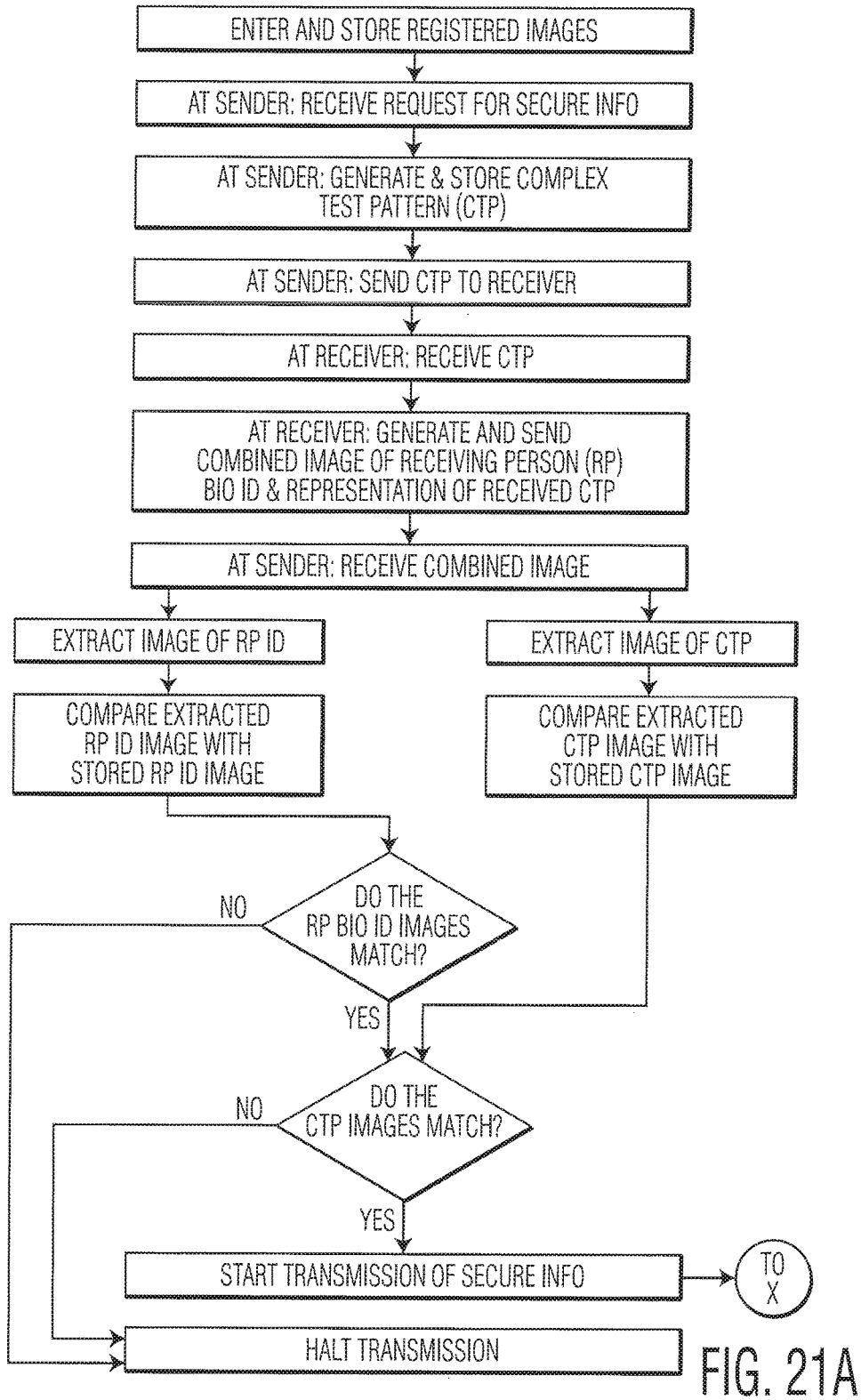
FIGS. 21A and 21B are a flow diagram showing the operation of the apparatus of FIGS. 17A, 17B and 17C.
Figure 21B:
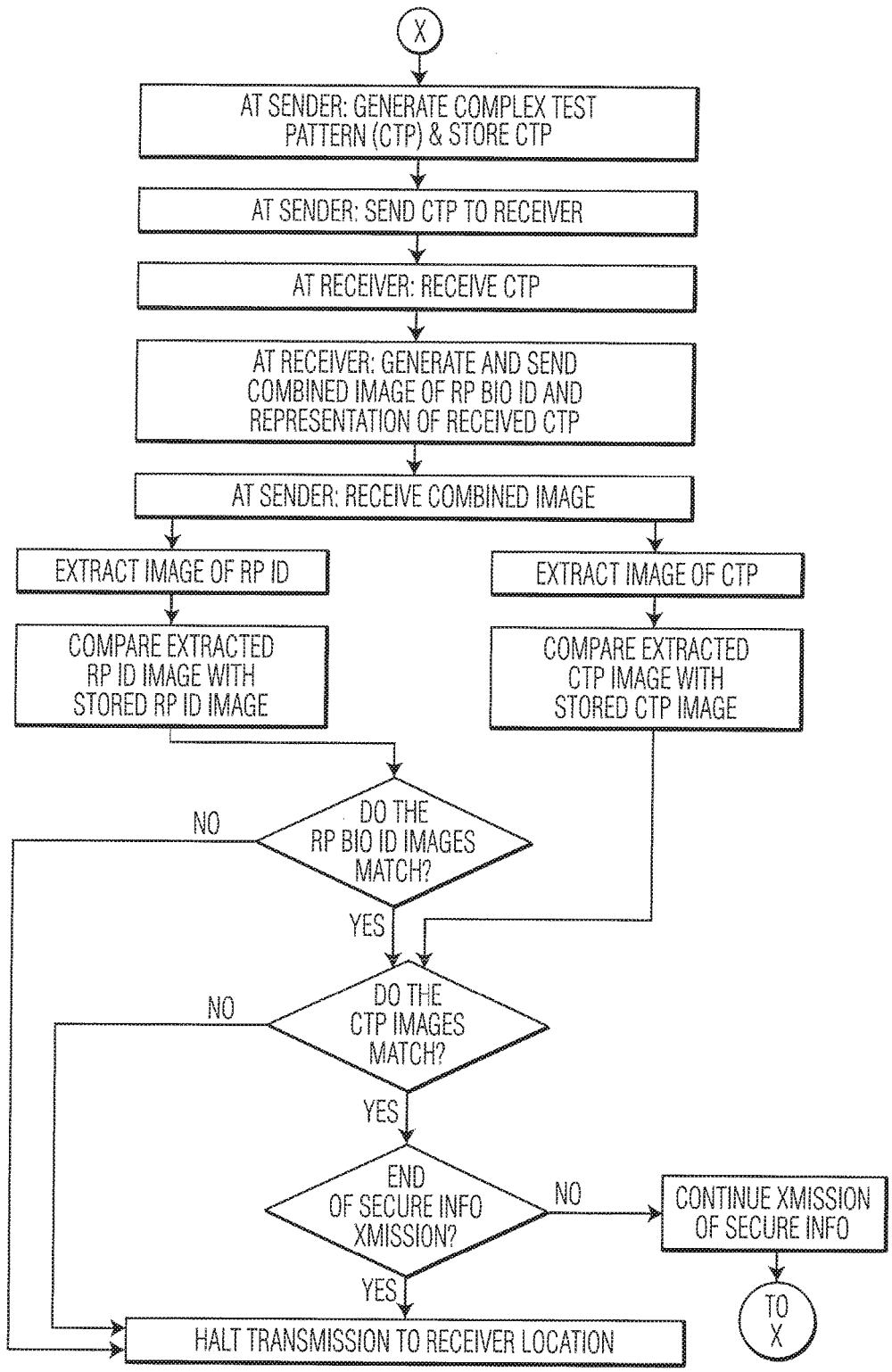

A flow diagram of the algorithm which embodies the schematics of FIGS. 20A and 20B is shown in FIGS. 21A and 21B.

Figure 22A:
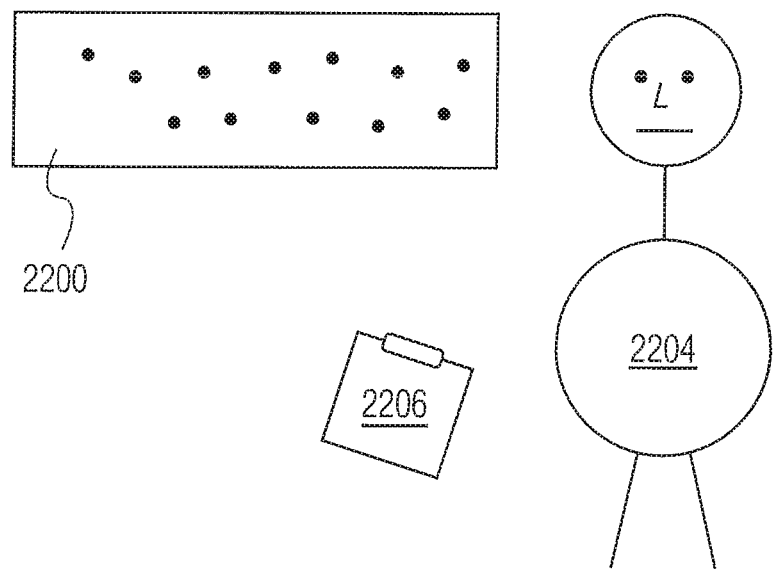
FIGS. 22A-22D are representational diagrams of apparatus for the simultaneous viewing of code information and an identifying biologic feature.
Figure 22B:
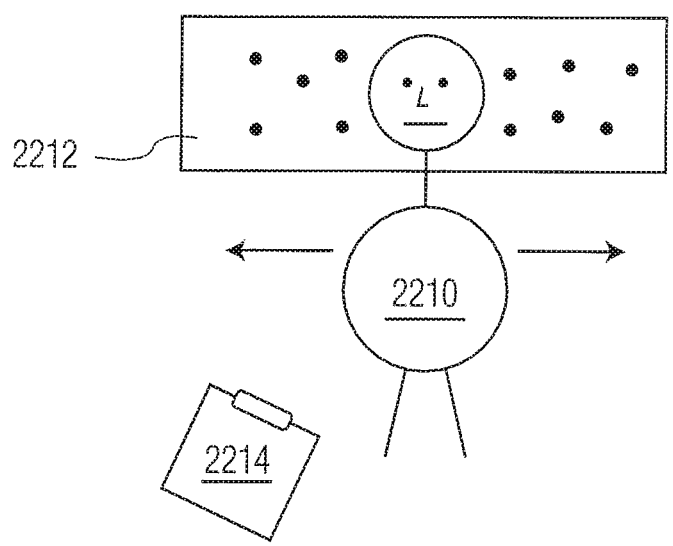

FIGS. 22A-22D show various configurations for merging the screen which shows a representation of the code, and a visible biologically unique feature of a person requesting receipt of information. In FIG. 22A, screen 2200 (in which the code representation is indicated by an array of randomly placed dots) is next to RP 2204. The iris, retinal vessels, face or other body part of 2204 is imaged with screen 2200 by camera 2206. In FIG. 22B, RP 2210 is situated in front of screen 2212. The scene is imaged by camera 2214. RP 2210 may receive prompts instructing the RP to move to the right or left, to move closer to or further away from 2212, etc. Having information about the spatial relationship between the camera 2214 and each of the RP and the screen allows the processor to calculate which portions of the imaged code become obscured or visible as the RP carries out the prompt instructions.

Figure 22E:
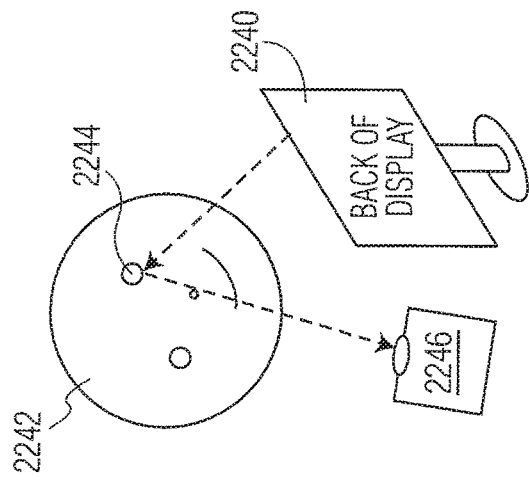
FIG. 22E is a representational diagram of apparatus for projecting information onto an organ comprising an identified biologic feature, and thence to a camera.
Figure 22D:
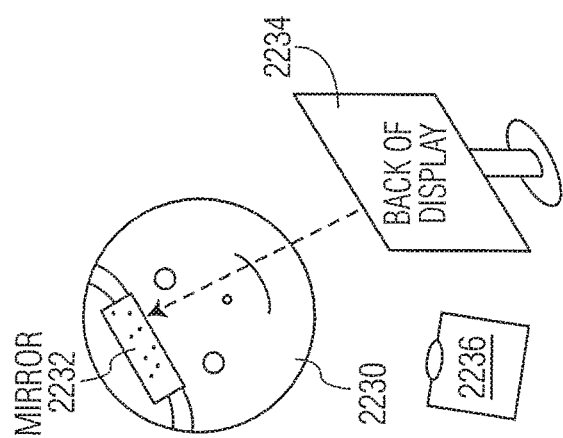
Figure 22C:
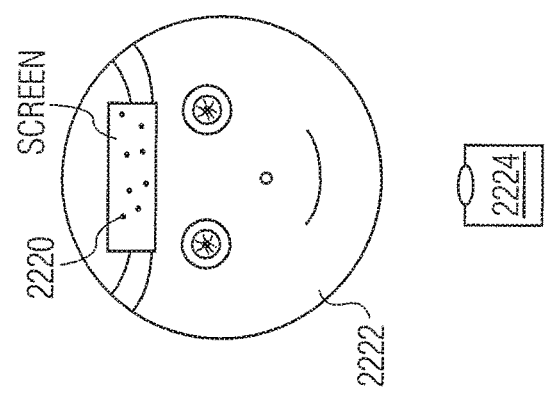

Yet another technique for merging the code screen and the BI is shown in FIG. 22C. Screen 2220 is wearable, attached to the head of RP 2222 by a headband. Camera 2224, pointed at the face of the RP can image the screen and either the iris, retinal vessels, face, skin quality, etc. of the RP.

FIG. 22D shows RP 2232 wearing a reflective surface—e.g. a mirrored item—above the eyes. The surface reflects the contents of screen 2234, on which the code would be displayed (code not seen because the back of screen faces the reader). Camera 2236, like camera 2234 in FIG. 22C images both the BI and the screen contents.

In the aforementioned detailed description of each of FIGS. 14B, 17A-C, 19, 20, 21A-B and 22A-D, the screen contents have been stated to be a representation of a code. However, an embodiment of the invention in which the screen contents are a message to the RP is also possible. Yet another variation is an embodiment in which the screen contents comprise a mixture of a message and a code. In some cases, these arrangements may be considered to be less desirable because the verification process would require two-way transmission of at least a part of the message: i.e. (a) from the processor to the screen, and (b) back to the processor as part of the composite image.

Although a two way version of the invention is possible, in which two people communicate each having a respective RP camera and display screen (or RP camera and prompt producing device), and each having a respective processor for analysis of the aforementioned matches, the two way transmission would increase the chance of interception and/or diversion of the message.

An additional means of security entails projecting a code image onto a reflective portion of the eye of the RP, and then imaging the reflected image. This is shown in FIG. 22E, in which display device 2240 projects a code image onto the eye 2244 of RP 2242, which is then imaged by camera 2246. This allows for especially close linkage of BI ID and code image, since both concern the eye of the RP.

Figure 23:
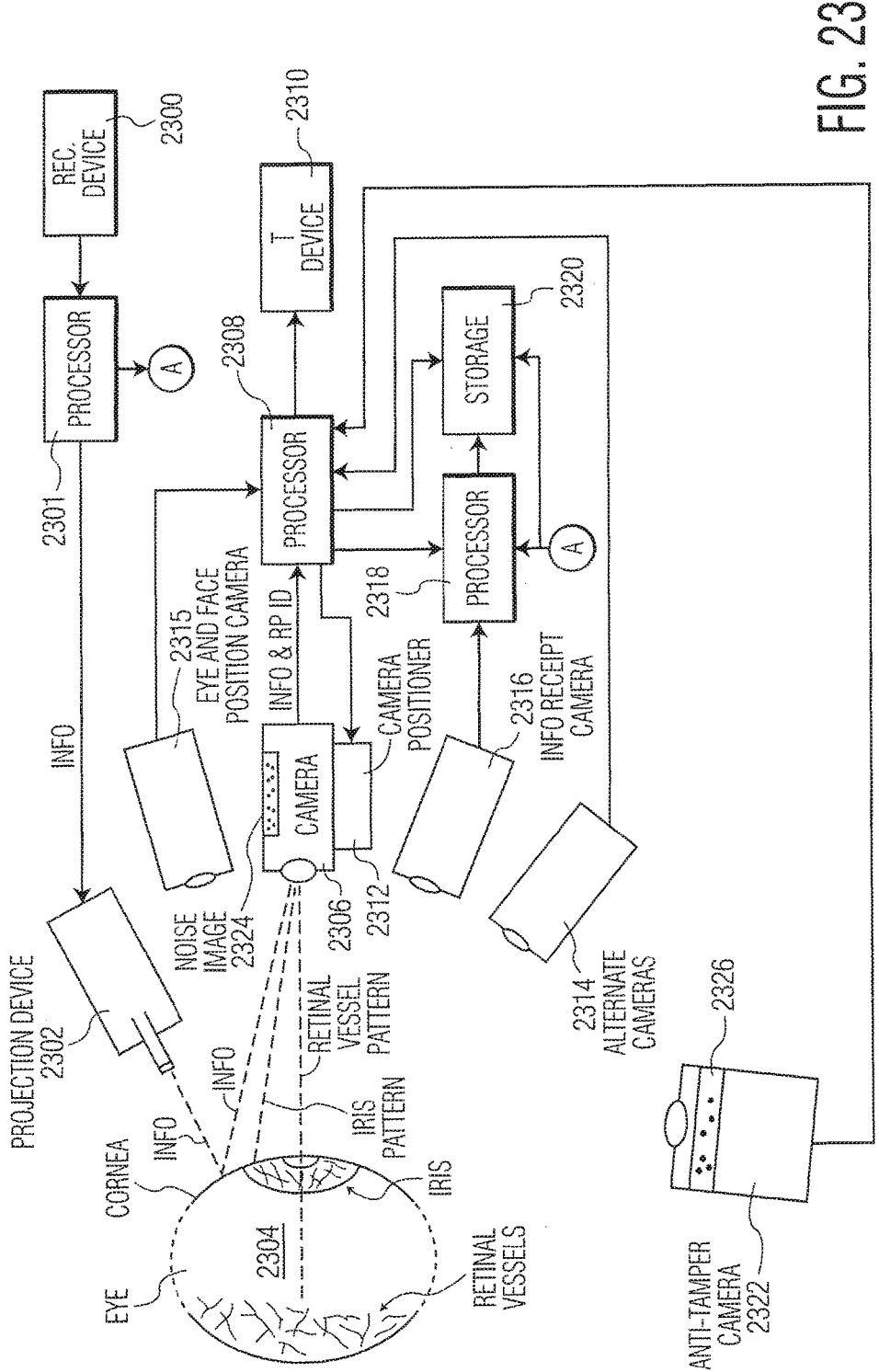
FIG. 23 is another representational diagram of apparatus for projecting information onto an organ comprising an identified biologic feature, and thence to a camera.

FIG. 23 shows a detailed version of this embodiment of the invention. Projection device 2302 receives coded information from receiving device 2300 which is projected onto eye 2304. Camera images the eye and BI (e.g. retinal vessel pattern or iris pattern) and sends the composite image via processor 2308 and transmitting device 2310 back to the processor which was the source of the code (e.g. 1700 in FIG. 17A) for analysis. Thus the code display screen is, effectively, the reflective surface of the eye. In order to deal with the fact that making such an arrangement functional requires that the eye be positioned so that the reflected image falls on the imaging device of camera 2306, various enhancements include:

(a) a camera positioned 2312, which receives positioning signals from processor 2308. Camera 2315, which views eye and face position provides positioning information for 2308, as does the image viewed by 2306;

(b) the addition of alternate cameras, such as camera 2314;

(c) (not shown in the figure) a positioning device similar to 2312, electrically linked to processor 2308 and mechanically linked to projection device 2302.

Figure 24:
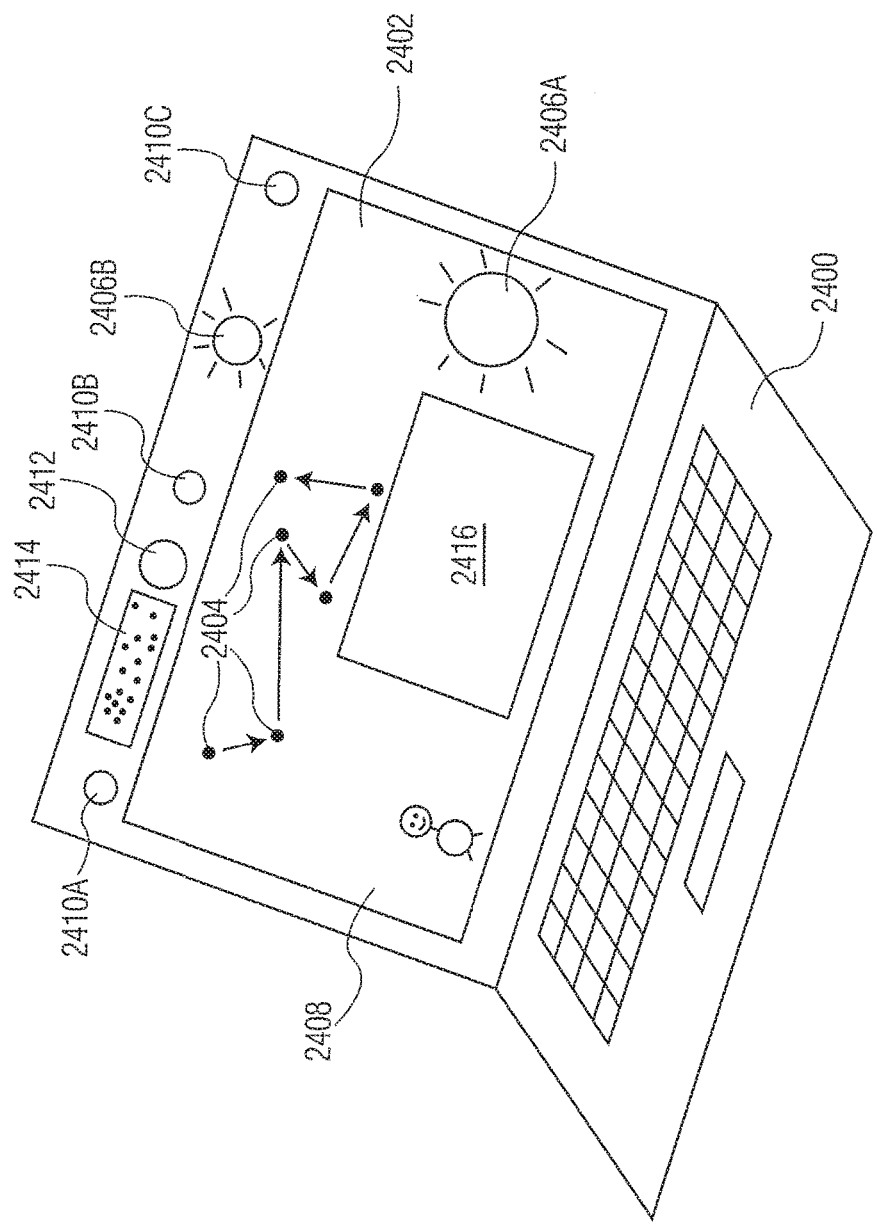
FIG. 24 is a representational diagram of a computational device which performs the functions of both the second and the third preferred embodiments of the invention.

In addition, prompts directed to the RP indicating instructions for orienting the face and eyes will enhance the success of this approach. Once such apparatus is shown in FIG. 24, in which (a) a stick/cartoon FIG. 2408 or a screen message 2416 provides such instructions (also discussed hereinabove in conjunction with the specification of FIG. 14A), and/or (b) a moving dot on screen 2402 indicates a preferred direction of gaze for the RP. The information for the dot position is supplied by processor 2308 of FIG. 23, and is updated on a high frequency basis. Many other arrangements for stabilization of the geometric arrangement of projection device, RP eye and cameras will be obvious to those skilled in the art.

Referring again to FIG. 23, message transmission in this embodiment of the invention also entails bouncing a light beam off of the eye, for detection by info receipt camera 2316 and storage (via processor 2318) in 2320; alternatively the message route could be
2306→2308→2318→2320 or
2306→2308→2320 or
2301→"A"→2318→2320 or
2301→"A"→2320. Variations in the route of information entry to 2320, and in the arrangement and number of cameras and processors will be apparent to those skilled in the art. Although three processors are shown in the figure, designs with a smaller or larger number of processors are possible. In each variation, the critical "loop" which allows the sender of information to properly identify the receiver of the information includes
2300→2302→2304→2306→2310.

Camera 2322, referred to as an anti-tamper camera is configured to view one or more of the elements in the figure to prevent tampering with them. It can also view a screen 2324 on the housing of camera 2306, which displays a code (either the same of a different code as reflected off of the eye), for verifying the identity of camera 2306. Alternatively, or in addition, camera 2306 can view a code on screen 2326 attached to the housing of the anti-tamper camera. The code displayed by 2326 may be the same as either of the aforementioned codes or different.

Referring again to FIG. 24, the laptop 2400 is configured to provide many of the features presented hereinabove. These include multiple cameras 2410A-C, a light source for pupil/iris manipulation which is either screen based (2406A) or discrete (2406B), a projection device 2412 analogous to that of FIGS. 22E and 23, element 2408 indicating a prompt for the voluntary motion discussed hereinabove, and a code display device 2414, for use in conjunction with the mirror apparatus of FIG. 22E. (Alternatively, the mirror device could be utilized with the code displayed on screen 2402.) The secure message for a verified RP would be either displayed on 2402 e.g. within area 2416, stored in a memory device of 2400, stored in an external memory device, or a combination of these.

Figure 25:
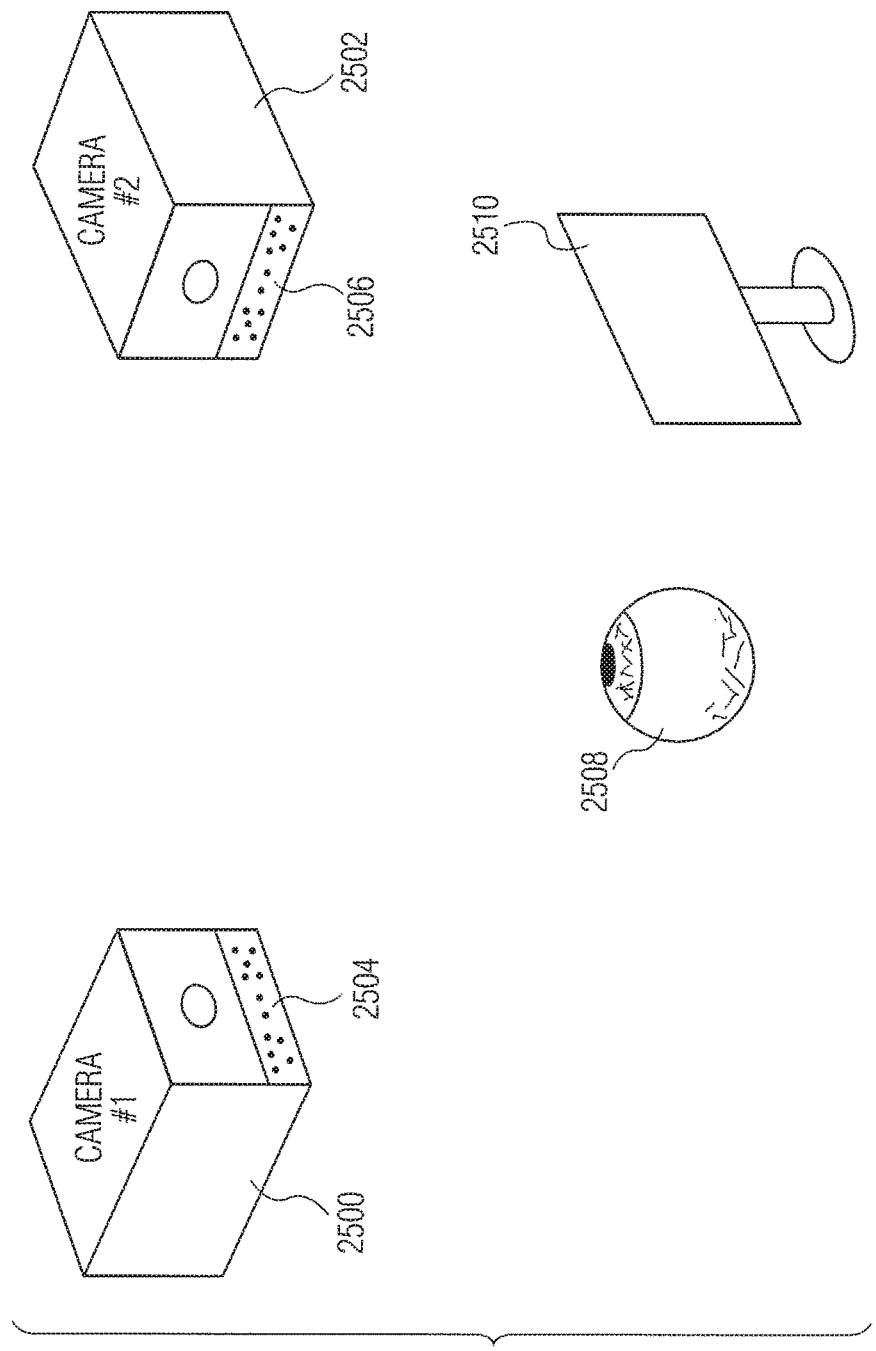
FIG. 25 is a representational diagram of an arrangement of cameras for further enhancing the security of both the second and the third preferred embodiments of the invention.

FIG. 25 shows an embodiment of the multi-camera security system, in which each of two cameras 2500 and 2502 observes (a) the other camera and (b) at least one of (i) the bio ID 2508, and (ii) the code display screen 2510. At least one camera also comprises a respective code display screen 2504 and 2506, for verifying the identity of the camera. The code representation displayed by each of 2504, 2506 and 2510 may be the same or different.

Figure 26:
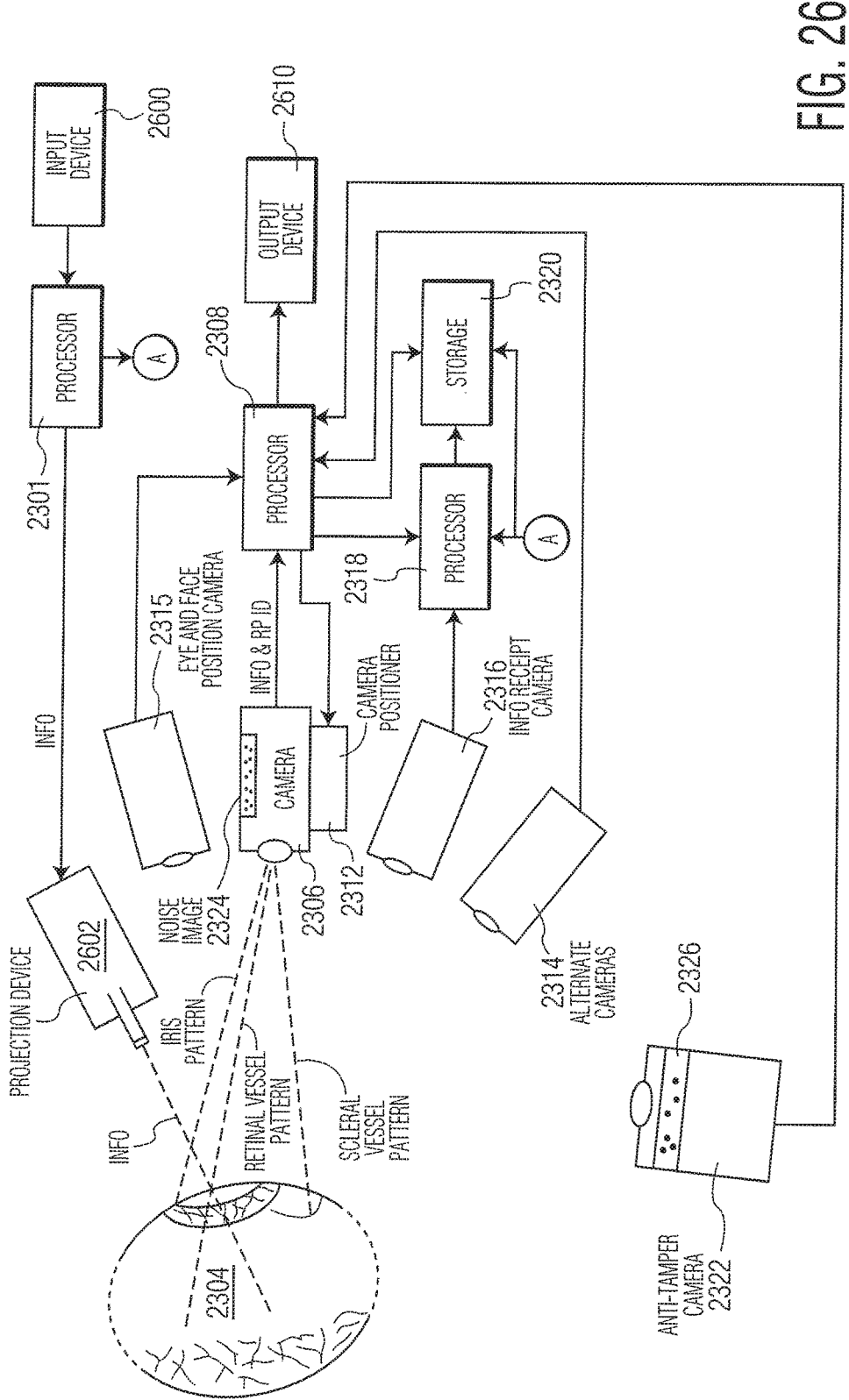
FIG. 26 is another representation diagram of the apparatus for the projection of information onto a human eye and for identifying the person receiving the information based on biologic identifiers of the eye.

FIG. 26, similar to FIG. 23, shows another representation diagram of the apparatus allowing for the determination of the identity of a person who desires to receive information, or who is in the process of receiving such information. The apparatus allows for the projection of information onto a human eye and allows for identifying the person receiving the information based on biologic identifiers of the eye. (Element numbers of devices which in FIG. 23 performed similar functions to that of the corresponding devices in FIG. 26 have been retained.) Whereas FIG. 23 addresses—among other concepts—the projection of information onto a reflective surface of the eye of a recipient of information, in order to determine the identity of the recipient; FIG. 26 concerns the direct projection of secure information being sent to the recipient onto the retina of an eye of the recipient. The concepts underlying this approach are (a) to utilize at least one biologic identifier of the receiver of the information;

(b) to minimize the distance between the biologic identifier of the recipient and the body part of the recipient which receives the information; and (c) in concert with (b), to minimize the distance between the apparatus for detecting the biologic identifier and the apparatus for providing the information.

Figure 27:
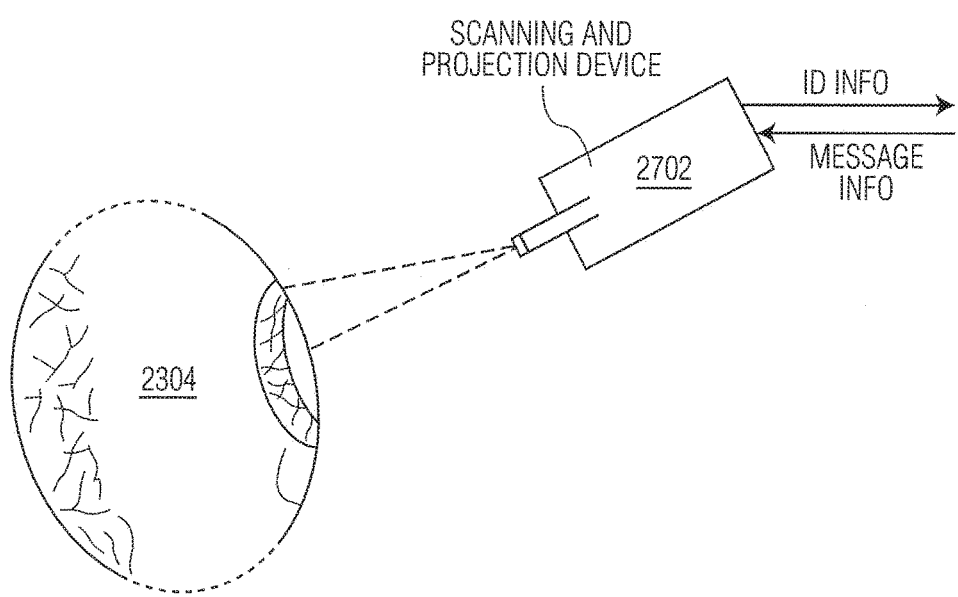
FIG. 27 is a representational diagram of apparatus for both projecting information onto a human and determining the identity of the person corresponding to the eye receiving the information.

Minimizing these distances allows for the implementation and optimization of various security measures including:

(a) the inclusion of each of the camera observing the biologic identifier and the projection device within a single housing (see FIGS. 29A and 29B); and/or (b) allowing one or more cameras to view two or more of each of the essential items in the arrangement (as shown in each of FIGS. 23, 25, 26, 28A and 28B and as discussed in the corresponding specification): i.e. itself (in the case of a camera), another camera, the projection device and the eye of the recipient of the information; and (c) utilizing one device to perform both the projection function and the identification function, as shown in FIG. 27.

Referring to FIG. 26, eye 2304 is the eye of the recipient. Biologic identifiers of the eye which are utilized in the instant invention include the iris (discussed hereinabove), retinal blood vessels (arteries or veins), and blood vessels of the sclera (surface of the eye). Human identification by blood vessel pattern is known in the art.

Biodynamic identification, i.e. the remotely controlled manipulation of the appearance of a body part containing a biologic identifier is the subject of parent U.S. Pat. No. 9,152,837, parent application Ser. No. 14/874,922. An additional biodynamic identification approach is presented in Matos U.S. patent application Ser. No. 14/816,382: the use of remotely controlled implanted pacemaker devices to manipulate the fine points of vascular anatomy of the person in whom the device is implanted (by the alteration of a pacing rate or by the insertion of premature cardiac impulses), and to thereby allow for the determination of who is the recipient of a message (by observation of alteration of vascular anatomy in concert with the altered heart rhythm).

Input device 2600 (e.g. a receiving device utilizing RF or microwave or other frequency, a connection [either electrical or optical] to the Internet or to a private digital communications network, or a hardwired connection to any device which is a source of secure information), provides message information to projection device 2602. 2602 projects a representation of the information contained in the message onto the retina of eye 2304. 2602 may be a laser or other source of light output. Beam directing and focusing apparatus as are known in the art will allow the message to be directly projected onto the retina. The power output of 2602 will be sufficiently low to avoid damage to the eye.

Output device 2610 allows the transmission of biologic identification information and other security information to be sent to the entity which is the source of the secure information. Options for the particular type of output device are similar to those listed hereinabove for input device 2600.

Other functions of the projection device may include:
(a) providing visual prompts as discussed hereinabove, and
(b) providing a source of illumination, for optimally viewing eye 2304 and its structures.

The illumination may comprise visible light, infrared or both. Either of both of the prompt and illuminating functions may alternatively be performed by devices other than projection device 2602.

The other objects in FIG. 26 each perform the functions listed for the corresponding element numbers of FIG. 23, as discussed in the corresponding specification hereinabove.

The source of the secure message for the person whose eye is denoted by 2304 may be local (as shown in FIGS. 16A and 17A herein) or remote (as shown in FIGS. 16B, 16C, 17B and 17C). In this context, "local" indicates that the computational equipment which (a) identifies the receiving person and is the source of the secure message is "the same" as (b) the equipment which controls and interfaces with the camera and projection device. The aforementioned words "the same" are not intended to be interpreted strictly literally.

Figure 29A:
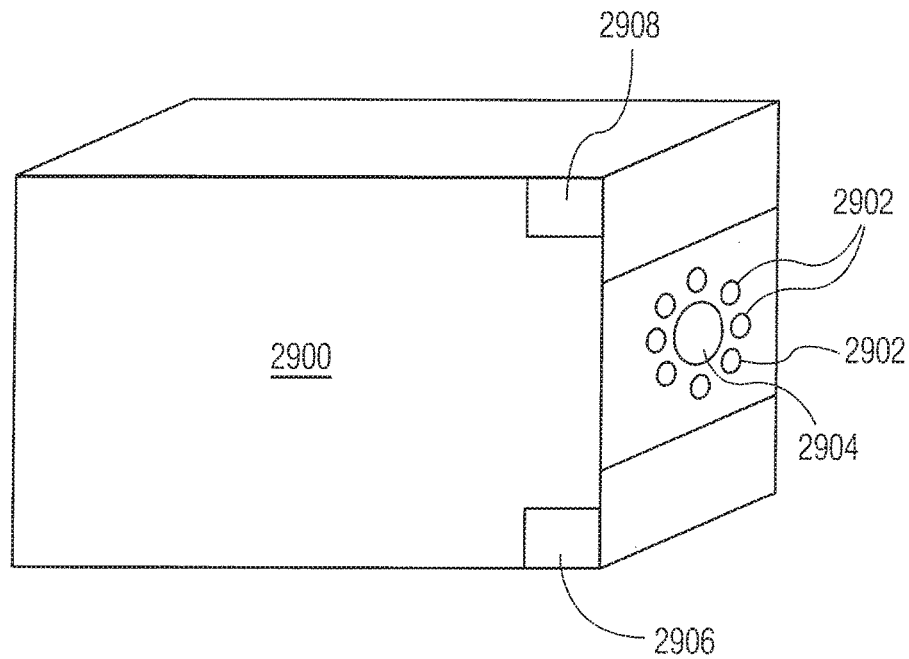
FIG. 29A is a representational diagram showing a circular array of projection devices with a single camera located in the middle of the projection device array.
Figure 29B:
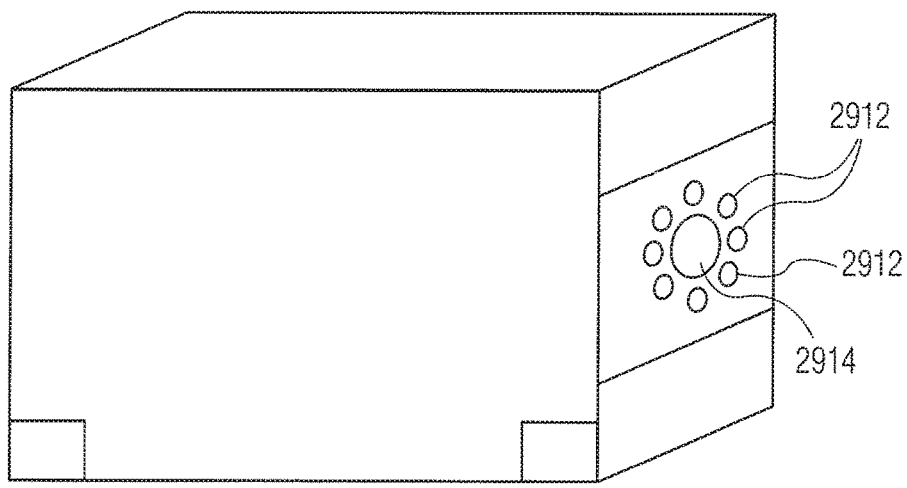
FIG. 29B is a representational diagram showing a circular array of cameras with a single projection device located in the middle of the camera array.

FIG. 29A shows apparatus 2900 which contains both the projection device and camera (each of FIG. 26) within housing 2900. Tamper detecting seals 2906 and 2908 are shown; any number and location of such seals is possible. The co-confinement of the projection device and camera apparatus allows the observer of the biologic or biodynamic identification information obtained by the camera(s) to know (with a high degree of certainty) that the information output (from the projection device) is directed at the person whose biologic information is at hand. In this particular figure projection device 2904 is surrounded by an array of cameras 2902 placed circumferentially around 2904. FIG. 29B shows similar apparatus except that in this instance, a single camera 2914 is surrounded by an array of projection devices 2912. Numerous other arrangements of one or more cameras and one or more projection devices may be contemplated.

FIG. 27 shows another approach to overcoming the security limitation imposed by separation of the camera and the projection device: combining both functions within device 2702. In one embodiment of the invention, 2702 is laser apparatus which (a) creates a map of one of the biologic identifiers of eye 2304 (e.g. iris or retinal vessels), and (b) provides/creates an information display on the retina for viewing by only the intended recipient (i.e. the person with identified iris, retina etc.).

Figure 28A:
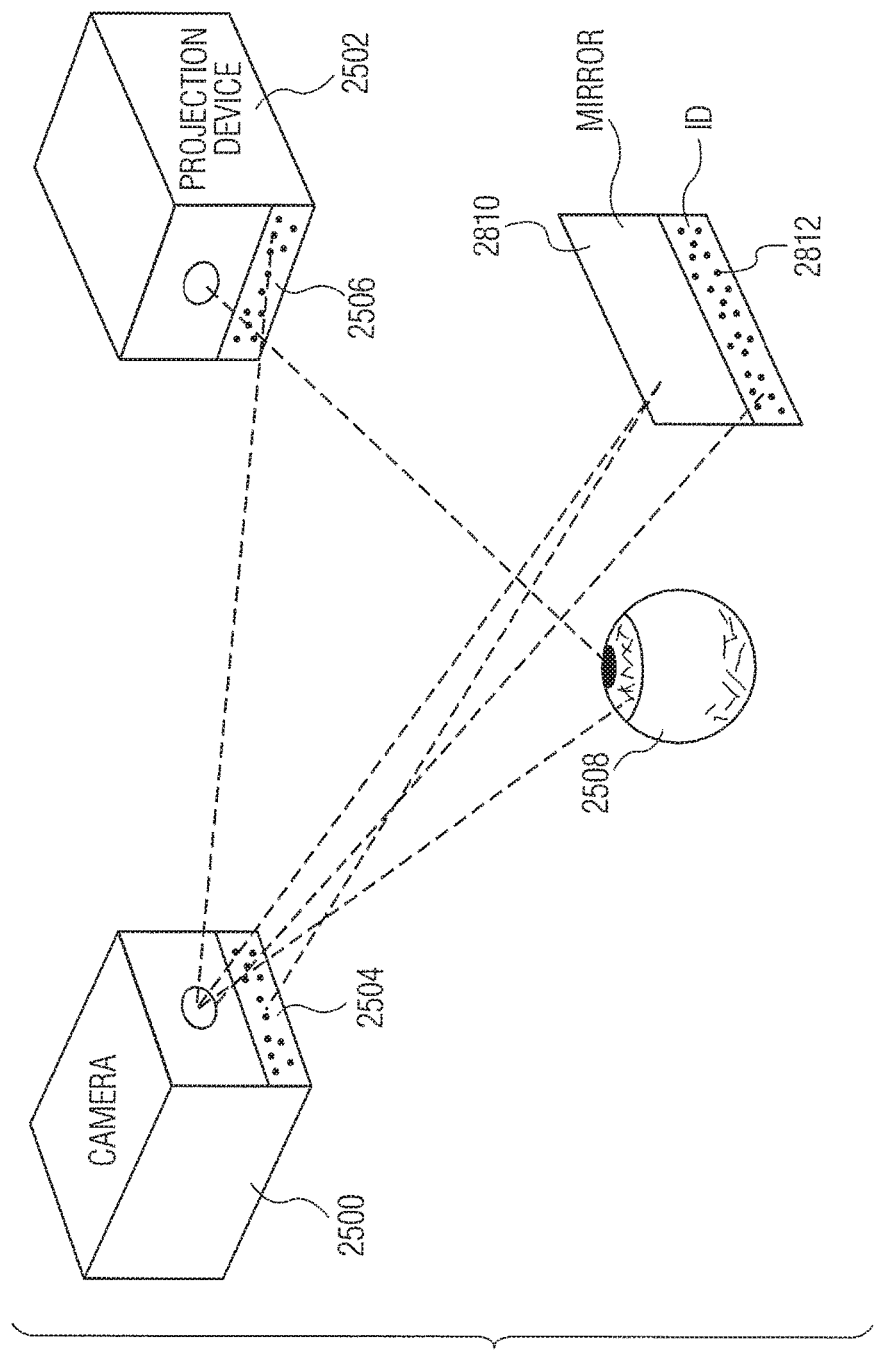
FIG. 28A is a representational diagram of a camera and projection device arrangement to prevent tampering and to allow the camera to observe each of the eye, the projection device, a mirror device and itself.
Figure 28B:
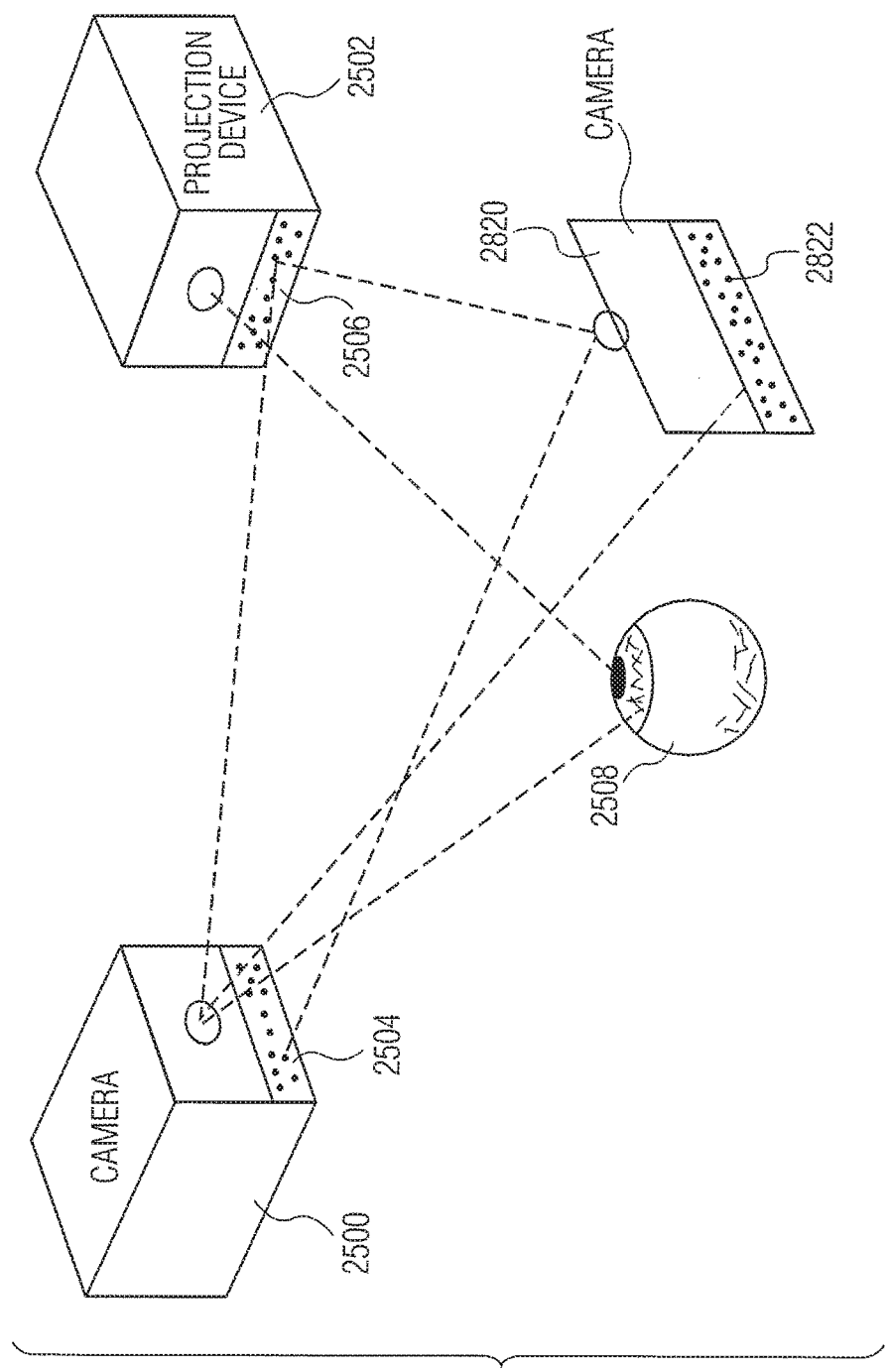
FIG. 28B is a representational diagram of two cameras and projection device arrangement to prevent tampering and to allow one camera to observe each of the eye, the projection device, a security camera; and to allow a second camera to observe both the first camera and the projection device.

FIGS. 28A and 28B show a detail of tamper-detecting apparatus presented hereinabove in conjunction with FIGS. 23 and 25. The crux of this approach is:

(a) as shown in FIG. 28A: to prevent tampering with the security apparatus by having a single camera 2500 view each of the eye 2508, the projection device 2502, and a mirror device 2810 which allows the camera to view itself, as shown in FIG. 28A; or (b) as shown in FIG. 28B: to modify the FIG. 28A approach by replacing the mirror device with a second camera 2820, which views both the main camera 2500 and the projection device 2502. (Alternatively, 2820 could be arranged to view each of 2500, 2502 and eye 2508).

As discussed in conjunction with each of FIGS. 23 and 25 hereinabove, each of the apparatus items of FIGS. 28A and 28B optionally contain a code bearing screen on its housing, which displays a code transmitted by either the entity sending the message, or another entity, and changing at a high frequency, and which allows the for the determination that each item in the figure has not been altered, or that items from different locales have been digitally merged. These code screens are 2504 for the camera which views the eye, 2506 for the projection device, 2812 for the mirror of FIG. 28A and 2822 for the second camera of FIG. 28B. The code screens may display the same code or different codes. They may appear on some, none or all of the apparatus items of each figure. If present, there may be one such screen or more than one on an object. Viewing may require visible or infrared light.

The inventions described herein are applicable for preventing an inappropriate person from gaining access to secret or classified information in a local or remote computer memory; Gaining access includes copying the information and corrupting the information.

There has thus been shown and described a novel system for verifying the identity of an author and for verifying the identity of a person receiving information or using a computer system, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A system for assessing the identity of a putative human individual at a given location and for providing information to a least one properly identified human individual, said system comprising:
   (I) providing apparatus ("PA") comprising, in combination:
      (a) at least one electronic camera arranged to view an iris of an eye of a putative human individual ("PHI"), and operative to generate a camera signal representing images of a biologically unique feature of said iris;
      (b) a projection device arranged to provide a light output which conveys message information to said eye, said projection device having a projection device input and operative to provide said light output in response to an inputted projection signal;
      (c) a PA output device for providing an output signal representing said iris image information;

(d) a first PA input device for receiving at least one message information signal representing said message information and a prompt signal; and (e) a PA processor coupled to each of said electronic camera, said projection device, said PA output device and said first PA input device, said PA processor operative to:
   (1) receive said camera signal, produce said output signal; and provide said output signal to said PA output device;
   (2) receive said message information, produce a projection signal representing said message information and provide said signal to said projection device; and
   (3) receive said prompt signal and provide said signal to said projection device;

wherein said camera device is arranged and operative to provide an image of said iris in sufficient detail to permit the identification of said PHI;

wherein said projection device light output provides a representation of said received message information;

wherein said prompt signal specifies a projection device output for altering a state of said iris; and wherein said PA processor is further operative to cause said PA output device to provide at least one post-prompt iris image obtained from said camera following the application of said prompt; and (II) identification apparatus ("IA") for assessing the identity of said PHI, said IA comprising:
   (a) a computer memory in which is stored
      (1) data representing a plurality of images of a biologically unique feature of an iris of an eye of at least one registered human individual ("RHI") who is allowed to receive said message information, wherein each of said images is acquired during a different state of said RHI iris, each said state influencing said image of said iris; and
      (2) said message information;
   (b) a first input device for receiving said output signal representing said PHI iris image information;
   (c) an IA output device, operative to provide said at least one message information signal and said prompt signal to said first PA input device; and
   (d) an IA processor, coupled to each of said computer memory, said first IA input device and said IA output device, said IA processor operative
      (1) to receive said PHI iris image information;
      (2) to produce said prompt signal and provide said signal to said IA output device; and
      (3) to compare:
         (A) data representing (i) said at least one image of said iris, and (ii) said at least one post-prompt image of said iris of said PHI received from said electronic camera of said PA, with
         (B) said stored data representing said images of said iris of said RHI; and
      (3) based on said comparison, to determine whether the received PHI image and post-prompt image data substantially matches stored RHI data pertaining to said registered individual; and
      (4) upon the determination of said match, to obtain said message information from said memory and to cause said IA output device to provide said at least one message information signal;

whereby said eye of said PHI is both (i) the source of PHI identification information and (ii) the potential recipient of said message information;

whereby the biologic information pertaining to the iris of a person who wishes to receive said message information is compared to the biologic information pertaining to the iris of a person permitted to receive said message information;

thereby
   to verify that the PHI is the same individual as one of said at least one RHI by assessing said PHI iris image data, or
   to determine that the PHI is not the same individual as any one of said at least one RHI;
   thereby to provide said message information only to a properly identified individual.

2. The system defined in claim 1, wherein (a) said IA further comprises a second IA input device, coupled to said IA processor, for inputting said message information; and (b) said IA processor is further operative to provide said inputted message information to said computer memory.

3. The system defined in claim 1, wherein said IA further comprises a second IA input device, coupled to said IA processor, for inputting an IA message instruction command, and wherein said IA processor is further operative, upon receipt of said command, and upon determination of said match, to cause said IA output device to provide said at least one message information signal; wherein said IA provides said message information following the occurrence of both of said command input and said match determination.

4. The system defined in claim 1, wherein
(a) said PA further comprises a second PA input device, coupled to said PA processor, for inputting a PA message information request;
(b) said PA processor is further operative to cause said PA output device to provide a signal representing said request to said first IA input device; and
(c) said IA processor is further operative, upon receipt of (i) said request and (ii) the iris image information of the PHI requesting said message information, and upon the determination of a match of said received PHI iris information and said stored RHI iris information, to cause said output device to provide said at least one message information signal.

5. The system defined in claim 1, wherein
(a) said electronic camera is further operative to repeatedly generate said camera signal, representing successive iris images, and said PA processor is further operative to repeatedly (i) obtain said image information (ii) provide successive image information signals, and (iii) cause said PA output device to provide said information signals to said first IA input device;
(b) said IA input device is further operative to provide said repeated signals to said IA processor; and
(c) said IA processor is further operative to
   (1) repeatedly compare
      (A) said received data representing said image of said PHI iris, with
      (B) said stored data representing said at least one image of an iris of said RHI;
   (2) continue to provide said message information upon the determination of said match; and
   (3) halt the provision of said message information upon a determination of a non-match of said received PHI information and said stored RHI information;

thereby to halt the provision of a message in the event of a determination that the PHI iris information does not match any stored RBI information.

6. The system defined in claim 1, wherein said PA processor is further operative to produce said output signal representing information selected from the group consisting of (a) a representation containing an amount of information substantially similar to an amount of information contained in said camera signal, and (b) a representation containing an amount of information less than an amount of information contained in said camera signal.

7. The system defined in claim 1, wherein said PA processor is further operative to produce said output signal representing information selected from the group consisting of (a) a representation containing at least one mathematical transformation of the information contained in said camera signal, and (b) un-transformed information representing the information contained in said camera signal.

8. The system defined in claim 1, wherein
said IA processor is further operative to produce from said received PHI iris information, information selected from the group consisting of (a) a representation containing an amount of information substantially similar to an amount of information contained in said received PHI iris information, and (b) a representation containing an amount of information less than an amount of information contained in said received PHI iris information; and to compare said selected information to said stored data.

9. The system defined in claim 1, wherein said IA processor is further operative to produce from said received PHI iris information, information selected from the group consisting of (a) a representation containing at least one mathematical transformation of the information contained in said received PHI iris information, and (b) un-transformed information representing the information contained in said received PHI iris information.

10. The system defined in claim 1, wherein said projection device is selected from the group consisting of (a) a laser, and (b) a non-laser light source; having a light output, said projection device responsive to said projection signal to provide said message information.

11. The system defined in claim 1, further comprising a projection orientation device, coupled to said projection device, and to said PA processor, for orienting an axis of said light output;
wherein
(a) said PA processor is further operative to provide an orientation signal for orienting said projection orientation device; and
(b) in response to the receipt of said orientation signal, said orientation device alters the spatial axis of said light output;
whereby said light output impinges on said iris at the axis determined by said orientation signal.

12. The system defined in claim 11, wherein said projection orientation device comprises at least one actuator mechanically coupled to said projection orientation device and electrically coupled to said PA processor, for causing a motion of said orientation device in response to said orientation signal.

13. The system defined in claim 11, wherein said projection orientation device comprises at least one field generating device coupled to said PA processor, said field selected from the group consisting of an electric field and a magnetic field, said field produced in response to at least one field control signal provided by said PA processor;
wherein said field generating device is arranged to cause the generation of said field to control said axis.

14. The system defined in claim 1 further comprising a focusing device, coupled to said PA processor, for focusing said light output, thereby to optimize the viewing by said eye of information represented by said light output.

15. The system defined in claim 1, wherein said PA output device is selected from the group consisting of:
(a) a transmitting device operative to transmit an electromagnetic output signal representing said iris image information; and
(b) electrical connecting means operative to provide an electrical output signal representing said iris image information via said connecting means.

16. The system defined in claim 1, wherein said first PA input device is selected from the group consisting of
(a) a receiving device operative to receive each of (i) an electromagnetic message information signal representing said message information, and (ii) an electromagnetic prompt signal; and
(b) electrical connecting means operative to receive each of (i) an electrical message information signal representing said message information, and (ii) an electrical prompt signal.

17. The system defined in claim 1, wherein
said projection device is further operative to produce a light prompt for projection onto said PHI eye in response to said prompt signal, for inducing at least one anatomic change in said iris eye of said PHI.

18. The system defined in claim 17, wherein
(a) said plurality of stored RHI images comprises images obtained under different lighting conditions for each RHI iris; and
(b) said projection device is configured to provide a quantity of light in response to said prompt signal sufficient to alter an opening size of said PHI iris;
whereby said IA processor is operative to induce said at least one anatomic change in said PHI iris and to compare the data representing an image of the post-prompt PHI iris with stored data representing RHI images, to further assess the identity of said PHI.

19. The system defined in claim 18, wherein said IA processor is further operative to assess whether received data representing an image of said PHI iris under a given lighting condition corresponds to data representing a stored image of the iris of a RHI for a similar lighting condition; thereby to determine if the observed anatomic change is appropriate for the lighting condition.

20. The system defined in claim 17, wherein said IA processor is operative to cause PA processor to cause said projection device to vary the amount of light produced by said prompt; thereby to determine if any lighting condition causes the PHI image to match a RHI image.

21. The system defined in claim 17, wherein said IA processor is further operative to generate data representing calculated RHI images from data representing at least one of said stored RHI images, and to compare said received data representing said PHI image with both said stored and said calculated RHI image data.

22. The system defined in claim 17, wherein said IA processor is operative to cause said PA processor to alter the duration of illumination provided by said projection device.

23. The system defined in claim 17, wherein
(a) said IA processor is further operative to determine a time of IA provision of said prompt signal,
(b) said PA processor is further operative to indicate a time at which data representing said PHI image is obtained, and (c) said IA processor is further operative to determine whether said received post-prompt PHI image information is temporally consistent with a response to a prompt delivered at said time of provision.

24. The system defined in claim 1, wherein
said projection device is further operative to produce a voluntary prompt message in response to said prompt signal, said voluntary prompt message requesting a specific action by said PHI expected to result in an alteration in the camera image of said eye.

25. The system defined in claim 1, wherein
said projection device further comprises a prompt producing device, coupled to said PA processor, operative to produce a light prompt in response to said prompt signal, for inducing at least one anatomic change in said iris of said PHI.

26. The system defined in claim 17, wherein said projection device is further operative to provide light for illumination of said eye, said illumination light having at least one wavelength selected from the group (a) wavelength corresponding to visible light, and (b) wavelength corresponding to infrared light, and wherein said IA processor is further operative to control the provision of said illumination light.

27. The system defined in claim 1, wherein said projection device further comprises a prompt producing device coupled to said PA processor, for communicating to said PHI a request to perform an action expected to result in a voluntary anatomic change in said image of said iris,
wherein said prompt producing device produces a prompt message in response to said prompt signal received from said PA processor; thereby to prompt an action under the conscious control of said PHI.

28. The system defined in claim 1, further comprising a housing to which each of said electronic camera and said projection device are mechanically attached.

29. The system defined in claim 1, wherein
(a) said IA processor is further operative to generate an outgoing representation of code information for transmission to said projection device and for storage in said computer memory;
(b) said projection device is further operative to provide a light signal representing said outgoing representation of code information received from said PA processor for projection onto a reflective surface of said eye;
(c) said camera is arranged to view said PHI such that said image includes a composite of both (i) said iris of said PHI; and (ii) a reflected image from said surface of said PHI eye, of said projected light signal representing said outgoing representation of said code;
(d) said PA processor is further operative to provide said composite image to said IA processor;
(e) said IA processor is further operative to receive said composite image representing both (i) an incoming representation of said code, and (ii) a representation of said iris;
(f) said IA processor is further operative to compare information contained in said outgoing representation of said code with information contained in said incoming representation of said code; and
(g) said IA processor is further operative to generate said message information signal upon comparison of stored and incoming iris and code information indicating matching results.

30. Apparatus for assessing the identity of a putative human individual at a given location and for providing information to a least one properly identified human individual, said apparatus comprising, in combination:

(a) at least one electronic camera arranged to view an iris of an eye of a putative human individual ("PHI"), and operative to generate a camera signal representing images of a biologically unique feature of said iris;
(b) a projection device arranged to provide a light output which conveys message information to said eye, said projection device having a projection device input and operative to provide said light output in response to an inputted projection signal;
(c) a computer memory in which is stored
(1) data representing (i) a plurality of images of a biologically unique feature of an iris of an eye of at least one registered human individual ("RHI") who is allowed to receive said message information, wherein each of said images is acquired during a different state of said RHI iris, each said state influencing said image of said iris; and
(2) said message information;
(d) a processor coupled to each of said electronic camera, said projection device, and said computer memory, said processor operative:
(1) to produce a prompt signal specifying a projection device output for altering a state of said iris, and provide said signal to said projection device;
(2) to receive and process said camera signal representing (i) said at least one image of said iris, and (ii) a least one post-prompt image of said iris of said PHI, obtained from said camera following the application of a prompt specified by said prompt signal;
(3) to compare:
(A) said data representing each of (i) said at least one image of said iris of said PHI, and (ii) said at least one post-prompt image of said iris of said PHI, with
(B) said stored data representing said images of said iris of said RHI; and
(3) based on said comparison, to determine whether the received PHI data substantially matches stored RIB data pertaining to said registered individual;
(4) upon the determination of said match, to obtain said message information from said computer memory, to produce said projection signal representing said message information and to provide said signal to said projection device;
wherein said camera device is arranged and operative to provide images of said iris in sufficient detail to permit the identification of said PHI;
whereby the biologic information pertaining to the iris of a person who wishes to receive said message information is compared to the biologic information pertaining to the iris of a person permitted to receive said message information;
whereby said eye of said PHI is both (i) the source of PHI identification information and (ii) the potential recipient of said message information;
thereby
to verify that the PHI is the same individual as one of said at least one RHI by assessing said PHI iris image data, or
to determine that the PHI is not the same individual as any one of said at least one RHI; and
to provide said message information only to a who is determined to be a RHI.

31. Apparatus for assessing the identity of a putative human individual at a given location and for providing information to a least one properly identified human individual, said providing apparatus ("PA") comprising, in combination:

(a) laser apparatus
  (i) arranged to survey an eye of a putative human individual ("PHI"); and operative to generate a laser survey signal representing images of an iris of said eye;
  (ii) operative and arranged to provide a light output which conveys message information to said eye, said laser apparatus having a projection input and operative to provide said light output in response to an inputted projection signal; and
  (iii) operative and arranged to provide a prompt output in response to a received prompt signal, for altering a state of said iris;

(b) a PA output device for providing an output signal representing said iris image information;

(c) a PA input device for receiving (i) at least one message information signal representing said message information and (ii) said prompt signal; and (d) a PA processor coupled to each of said laser apparatus said PA output device and said PA input device; said PA processor operative to:
  (1) receive said laser survey signal, produce an output signal representing said iris image information; and provide said output signal to said PA output device;
  (2) receive said message information, produce a projection signal representing said message information and provide said signal to said laser apparatus;
  (3) receive said prompt signal and provide said signal to said laser apparatus;

wherein said laser apparatus is arranged and operative to provide an image of said iris in sufficient detail to permit the identification of said PHI;

wherein said laser apparatus light output provides a representation of said received message information;

wherein said prompt signal specifies a laser apparatus output for altering a state of said iris;

wherein said PA processor is further operative to cause said PA output device to provide at least one post-prompt iris image obtained from said laser apparatus following the application of said prompt; and whereby said eye of said PHI is both (i) the source of PHI identification information and (ii) the potential recipient of said message information.

32. A system comprising the PA recited in claim 31 and further comprising identification apparatus ("IA") for assessing the identity of said PHI, said IA comprising:

(a) a computer memory in which is stored
  (i) data representing a plurality of images of a biologically unique feature of an iris of an eye of at least one registered human individual ("RHI") who is allowed to receive said message information, wherein each of said images is acquired during a different state of said RHI iris, each said state influencing said image of said iris; and
  (ii) said message information;

(b) an IA input device for receiving said output signal representing said PHI iris image information;

(c) an IA output device, operative to provide said at least one message information signal and said prompt signal to said PA input device; and (d) an IA processor, coupled to each of said computer memory, said IA input device and said IA output device, said IA processor operative
  (1) to receive said PHI iris image information;
  (2) to produce said prompt signal and provide said signal to said IA output device; and
  (3) to compare:
    (A) data representing said at least one image of said iris, and (ii) said at least one post-prompt image of said iris of said PHI received from said PA, with
    (B) said stored data representing said images of said eye of said RHI;
  (3) based on said comparison, to determine whether the received PHI image and post-prompt image data substantially matches stored RHI data pertaining to said registered individual; and
  (4) upon the determination of said match, to obtain said message information from said memory and to cause said IA output device to provide said at least one message information signal;

whereby the biologic information pertaining to the iris of a person who wishes to receive said message information is compared to the biologic information pertaining to the iris of a person permitted to receive said message information; thereby
  to verify that the PHI is the same individual as one of said at least one RHI by assessing said PHI iris image data, or
  to determine that the PHI is not the same individual as any one of said at least one RHI.

33. The system defined in claim 31, wherein said laser apparatus comprises at least one laser operative and arranged to provide each of said light output and said prompt output.

34. The system defined in claim 31, wherein said laser apparatus comprises at least one laser and a prompt producing device for providing said prompt output.

35. The system defined in claim 1, wherein said IA input device is selected from the group consisting of:
  (a) a receiving device operative to receive an electromagnetic output signal representing said iris image information; and
  (b) electrical connecting means operative to receive an electrical output signal representing said iris image information via said connecting means.

36. The system defined in claim 1, wherein said IA output device is selected from the group consisting of:
  (a) a transmitting device operative to transmit each of (i) at least one electromagnetic message information signal representing said message information, and (ii) an electromagnetic prompt signal; and
  (b) electrical connecting means operative to provide (i) at least one electrical message information signal representing said message information, and (ii) an electrical prompt signal.

37. The system defined in claim 1 further comprising a communications system, wherein said communications system is operative to:
  (a) receive said output signal and provide a signal representing said iris information to said first IA input device,
  (b) receive said at least one message information signal and provide said message information to said first PA input device, and
  (C) receive said prompt signal and provide information represented by said prompt signal to said first PA input device.

38. A system for assessing the identity of a putative human individual at a given location and for providing information to a least one properly identified human individual, said system comprising:
- (I) providing apparatus ("PA") comprising, in combination:
  - (a) at least one electronic camera arranged to view both an iris of an eye of a putative human individual ("PHI") and a code image reflected from said eye, and operative to generate a camera signal representing at least one composite image, each composite image including each of said iris and said code image;
  - (b) a projection device arranged to provide a light output which conveys (i) message information to a pupil of said eye, and (ii) a representation of generated code information to a reflective surface of said eye; said projection device having a projection device input and operative to provide said light output in response to an inputted projection signal, wherein said code image is a reflection of said light conveying said representation of generated code information;
  - (c) a PA output device for providing an output signal representing said composite image information;
  - (d) a PA input device for receiving (1) at least one message information signal representing said message information and (2) a code signal specifying generated code information; and
  - (e) a PA processor coupled to each of said electronic camera, said projection device, said PA output device and said PA input device, said PA processor operative to:
    - (1) receive said camera signal, produce said output signal representing said camera signal; and provide said output signal to said PA output device; and
    - (2) receive said message information and said code signal, produce a projection signal representing said message information and said generated code information, and provide said projection signal to said projection device;
- (II) identification apparatus ("IA") for assessing the identity of said PHI, said IA comprising:
  - (a) a computer memory in which is stored
    - (1) data representing at least one image of a biologically unique feature of an iris of an eye of at least one registered human individual ("RHI") who is allowed to receive said message information;
    - (2) said message information; and
    - (3) said generated code information;
  - (b) an IA input device for receiving said output signal;
  - (c) an IA output device, operative to provide said at least one message information signal and said code signal to said PA input device; and
  - (d) an IA processor, coupled to each of said computer memory, said IA input device and said IA output device, said IA processor operative
    - (1) to generate code information, to store said generated code information in said computer memory, to generate said code signal specifying said generated code information; and to provide said code signal to said IA output device;
    - (2) to receive said output signal representing said composite image information;
    - (3) to compare:
      - (A) a representation of said iris of said PHI specified by said received composite image information, with
      - (B) said stored data representing said at least one image of said iris of said RHI;
    - (4) to compare:
      - (A) a representation of said code information specified by said received composite image information, with
      - (B) said stored generated code information; and
    - (5) based on said comparisons, to determine (A) whether the received PHI iris data substantially matches the stored RHI iris data pertaining to said registered individual; and (B) whether the received representation of said code information substantially matches the stored generated code information; and
    - (6) upon the determination of both of said matches, to obtain said message information from said memory and to cause said IA output device to provide said at least one message information signal;
  - whereby said eye of said PHI is (i) the source of PHI identification information, (ii) the recipient of a representation of said generated code information and the source of said code image, and (iii) the potential recipient of said message information;
  - whereby each of (A) code information returned from said PA and (B) the biologic information pertaining to the iris of a person who wishes to receive said message information is compared, respectively, to (C) code information generated at said IA and (D) the biologic information pertaining to the iris of a person permitted to receive said message information; and said message information is provided only upon the determination of both said code and said iris matches.

39. The system defined in claim 38, wherein
- (a) said IA processor is further operative to repeatedly generate changing additional code information, to store said generated changing additional code information ("GCACI") in said computer memory, and to generate additional code signals ("ACSs"), each signal specifying changed additional generated code information;
- (b) said IA output device is further operative to provide said ACSs to said PA input device;
- (c) said PA input device is further operative to provide said ACSs to said PA processor;
- (d) said PA processor is further operative to repeatedly receive said message information and said ACSs, and to produce repeated additional projection signals; each said signal representing said message information and said GCACI, and provide said repeated additional projection signals to said projection device;
- (e) said projection device further conveys (i) message information to a pupil of said eye, and (ii) successive representations of said GCACI to said reflective surface of said eye;
- (f) said at least one electronic camera is further operative to repeatedly generate additional camera signals representing successive composite images, each composite image including said iris and an additional code image, wherein each additional code image is a reflection of said light conveying one of said successive representations of said GCACI;

(g) said PA processor is further operative to repeatedly (i) obtain said composite image information (ii) provide successive output signals reflecting said repeatedly changing composite images, and (iii) cause said PA output device to repeatedly provide said changing output signals to said IA input device;
(h) said IA input device is further operative to provide said repeated output signals to said IA processor; and
(i) said IA processor is further operative to
  (1) receive said repeated output signals, each representing one of said successive composite images;
  (2) repeatedly compare
    (A) a representation of said GCACI specified by one of said received successive composite images, with
    (B) respective stored GCACI;
  (3) repeatedly compare said stored and said received iris information;
  (4) based on said comparisons, to determine (A) whether each received representation of said GCACI substantially matches the respective stored GCACI; and (B) whether the received PHI iris data substantially matches the stored RHI iris data pertaining to said RHI; and;
  (5) continue to provide said message information upon the determination of both of said matches; and
  (6) halt the provision of said message information upon a determination of a non-match of either said GCACI or said iris information.

40. The system defined in claim 38 further comprising a communications system, wherein said communications system is operative to:
  (a) receive said output signal from said PA output device and provide a signal representing said composite information to said IA input device; and
  (b) receive said at least one message information signal and said code signal from said IA output device, and provide the information represented by said signals to said PA input device.

41. The system defined in claim 38, wherein
  (a) each of said PA output device and said IA input device comprise electrical connecting means operative to provide said output signal from said PA output device to said IA input device; and
  (b) each of said IA output device and said PA input device comprise electrical connecting means operative to provide said at least one message information signal and said code signal from said IA output device to said PA input device.

* * * * *